United States Patent
Proudfoot

(10) Patent No.: US 7,894,924 B2
(45) Date of Patent: Feb. 22, 2011

(54) SYSTEM AND METHOD FOR INTERNET BASED AUTOMATED MEMORIAL DESIGN AND MANUFACTURING

(75) Inventor: Mark A. Proudfoot, Kingwood, WV (US)

(73) Assignee: Matthews Resources, Inc., Wilmington, DE (US)

( * ) Notice: Subject to any disclaimer, the term of this patent is extended or adjusted under 35 U.S.C. 154(b) by 311 days.

(21) Appl. No.: 11/937,767

(22) Filed: Nov. 9, 2007

(65) Prior Publication Data

US 2008/0154413 A1  Jun. 26, 2008

Related U.S. Application Data

(60) Provisional application No. 60/858,027, filed on Nov. 9, 2006.

(51) Int. Cl.
- G06F 19/00 (2006.01)
- B29C 39/00 (2006.01)
- B29C 33/40 (2006.01)
- G06Q 30/00 (2006.01)
- G06T 17/00 (2006.01)
- G06T 11/00 (2006.01)
- G03F 7/26 (2006.01)

(52) U.S. Cl. .......... 700/118; 700/98; 700/180; 700/197; 705/26; 264/219; 345/420; 345/467; 430/306

(58) Field of Classification Search ............. 700/97–99, 700/180, 182, 197, 118; 705/26, 27; 345/418–420, 345/441, 467, 469.1; 264/40.1, 219; 430/306
See application file for complete search history.

(56) References Cited

U.S. PATENT DOCUMENTS

| 4,412,799 | A | * | 11/1983 | Gates | 425/150 |
| 4,945,498 | A | * | 7/1990 | Mitamura | 345/441 |
| 5,202,793 | A | * | 4/1993 | Auge | 359/463 |
| 5,822,209 | A |  | 10/1998 | Fischer | |

(Continued)

*Primary Examiner*—Crystal J Barnes-Bullock
(74) *Attorney, Agent, or Firm*—The Webb Law Firm

(57) ABSTRACT

A system and method for manufacturing a memorial. The method providing a blank pattern in a memorial design and collaboration system having a specified shape and size and building a memorial preview thereon, then sending the memorial preview to a host computer. The host computer routes the memorial preview as a stored file to a manufacturer for projecting, onto a three-dimensional solid in the shape of said blank pattern, an image of said memorial preview. The method further includes creating a pattern by placing objects in the form of letters, emblems or numbers on the three-dimensional solid in connection with the projection, and creating a mold in connection with the pattern, and filling said mold and baking the filled mold.

19 Claims, 25 Drawing Sheets

U.S. PATENT DOCUMENTS

| | | | |
|---|---|---|---|
| 6,664,125 B2 * | 12/2003 | Watanabe et al. | 438/26 |
| 6,768,928 B1 * | 7/2004 | Nagasawa et al. | 700/98 |
| 6,823,227 B2 * | 11/2004 | Yamada et al. | 700/99 |
| 6,916,436 B2 * | 7/2005 | Tarabula | 264/40.1 |
| 6,917,905 B2 * | 7/2005 | Asano et al. | 703/1 |
| 6,950,713 B2 | 9/2005 | Walthall | |
| 7,393,485 B2 * | 7/2008 | Yourist | 264/219 |
| 7,448,020 B2 * | 11/2008 | Kohno | 717/104 |
| 7,526,360 B2 * | 4/2009 | Oshitani et al. | 700/197 |
| 7,751,066 B2 * | 7/2010 | Iwasaki | 356/610 |
| 7,759,049 B2 * | 7/2010 | Yamada et al. | 430/306 |
| 7,797,070 B2 * | 9/2010 | Dilbeck et al. | 700/118 |
| 2001/0025459 A1 | 10/2001 | Barnes | |
| 2002/0032498 A1 | 3/2002 | Mattke et al. | |
| 2003/0233162 A1 * | 12/2003 | Kawai et al. | 700/116 |
| 2007/0190256 A1 * | 8/2007 | Darby et al. | 427/407.1 |

* cited by examiner

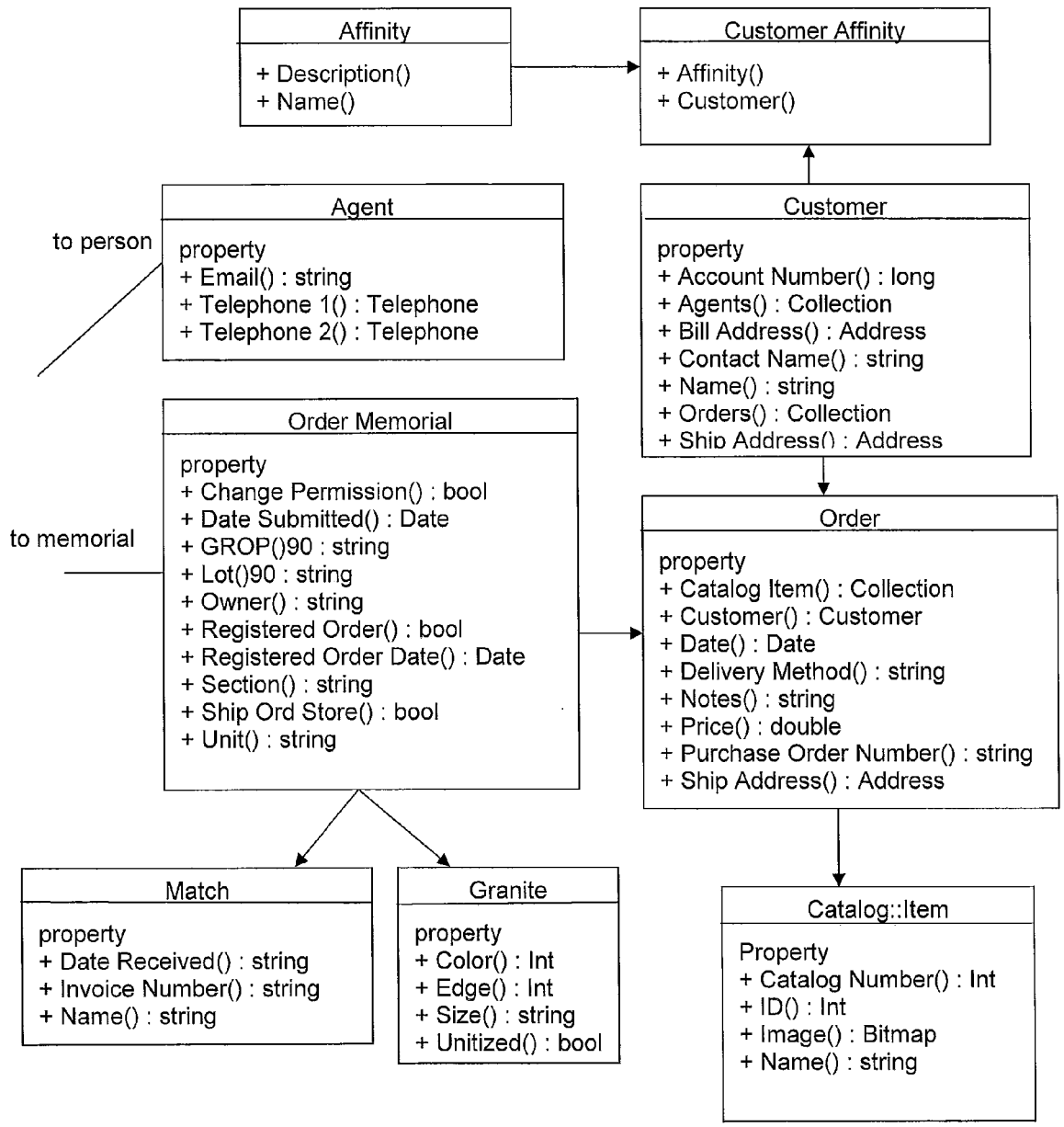
Fig. 21 Con't.

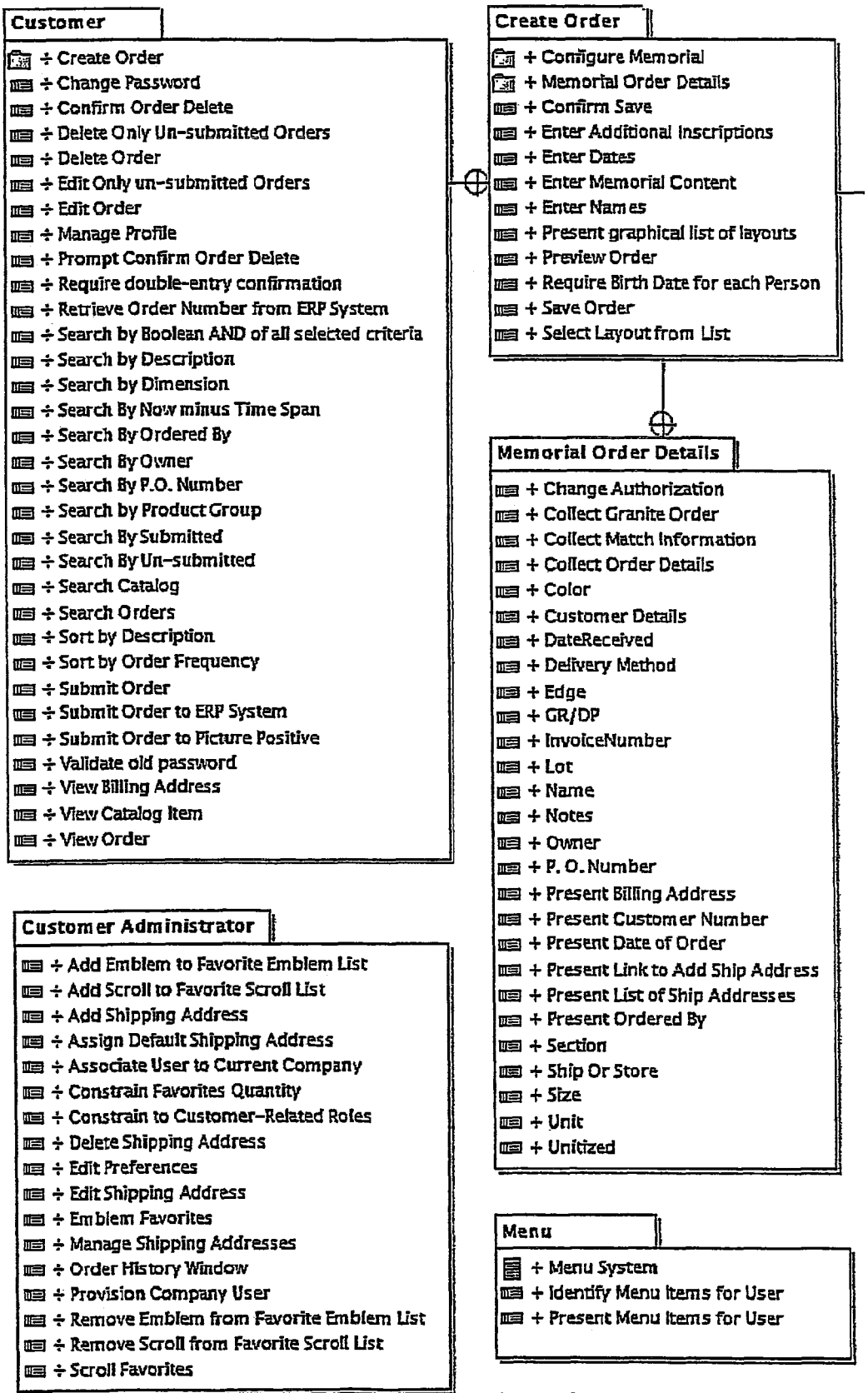
Fig. 23 Con't.

SYSTEM AND METHOD FOR INTERNET BASED AUTOMATED MEMORIAL DESIGN AND MANUFACTURING

CROSS REFERENCE TO RELATED APPLICATIONS

This application is based on U.S. Provisional Patent Application No. 60/858,027, filed Nov. 9, 2006, on which priority of this patent application is claimed and which is hereby incorporated by reference in its entirety.

BACKGROUND OF THE INVENTION

1. Field of the Invention

The invention relates to memorial design and, more particularly, to systems and methods for automating same.

2. Disclosure of the Prior Art

Traditionally, memorial orders were done manually by completing a standard paper order form. The order was either mailed or faxed from the customer to the seller/manufacturer. The mail or fax order was received in the mailroom and was processed thereafter. Processing of an order was manual and required the manufacturer to manually enter processing data, which could include a customer number, a purchase order number and an order barcode number. The customer order included a catalog number which identified a predetermined graphical design chosen from a catalog. Once the order was entered based on the format of the order and the catalog number of the order, specific charges were manually entered pertaining to that order. The system then generated a confirmation purchase order, which included a graphical representation of the proposed memorial.

Over time, electronic catalogs showing various memorial design options have been created. The client was sent an electronic catalog of all the different configurations of memorials available. A typical client is a funeral home who has customers that come in, browse the electronic catalog, and place their orders with the funeral home director. The funeral home then sends the order to the seller/manufacturer. The client browses through the configurations in a casual setting and decides which configuration or combination of configurations they would like; the customer and funeral home place this in the order and send the order to the seller.

The graphic is created by the graphic specialist by looking at the format of the image or the catalog numbers and text that the order contains and then creating a graphical image. The graphical image can be uploaded as a file into the manufacturing software system and checked against the customer order for verification purposes.

Order processing according to the prior art is very difficult to process on the seller's side and, therefore, is an expensive solution. The time required for mailed or faxed orders is expensive and delays the order. In addition, possible invalid or missing information because of the processing could further delay the order and further increase expense. In addition, the prior art system requires re-entry of all data. As shown in FIG. 1, a prior art system having an online presence is shown. In this system, the user can enter data into the web interface; however, this data is only transferred to the point where personnel of the manufacturer can process the data. The additional step shows the process and adds risk that human error will enter into the process flow.

Once the intake personnel process the data, they can then enter the data into a system the information they have received from the customer. They are responsible for designing the graphic based on the information put by the user. This information is then checked by further personnel before it is sent to other discrete systems for processing the manufacturing and billing.

Therefore, it is an object of this invention to create a new system and process whereby the limitations of multiple entries into multiple systems and non-existent graphical images processed at the customer site can be overcome.

SUMMARY OF THE INVENTION

A system and method for manufacturing a memorial, provides a blank pattern in a memorial design and collaboration system (MDCS) having a specified shape and size. A memorial preview is built and the memorial preview is sent to a host computer. The host computer routes the memorial preview as a stored file to a manufacturer for projecting, onto a three-dimensional solid in the shape of said blank pattern, an image of said memorial preview. The method further includes creating a pattern by placing objects in the form of letters, emblems or numbers on the three-dimensional solid in connection with the projection, and creating a mold in connection with the pattern. The mold is filled and baked. A pattern can be included on said three-dimensional solid prior to projecting said memorial preview. For example, a border can be included on the solid.

The memorial design and collaboration system provides a layout view of the memorial preview. The customer selects items to layer on the memorial, including a finish, first name, family name or a date. The items are stored in a catalog in a database. The catalog is searchable based on text, security permissions or catalog identification numbers. The selected item is displayed on the memorial preview. The customer can configure the items on the screen using the MDCS, for example, an entry options screen for adding a date, format and line number. An emblem may be selected from a personal emblem list and included in the memorial preview. MDCS enables positioning the emblems on the memorial preview. In addition, vases and inscriptions may be available in the MDCS for adding to the memorial preview.

The MDCS further provides an order entry screen for logging on to the system, storing customer information into memorial design application software, storing an order number associated therewith, entering a purchase order number, entering shipping information, entering order notes, and validating inventory.

The MDCS provides an on and off state for determining permission for changing the memorial preview. The MDCS provides a system for a created memorial accompanied by order entry data to be transmitted from the customer computer to a host manufacturer computer for processing and manufacturing.

The MDCS includes a host node, a client node, a network for transmitting data and a client node engaging the host node via software loaded on the client node, and further wherein the software interacts with a processor on the host node in order to exchange processing data and a memorial preview. The invention further includes a memorial exhibiting a three-dimensional engraved surface created with the MDCS.

BRIEF DESCRIPTION OF THE DRAWINGS

FIG. 13 illustrates a representative graphical user interface of an emblem screen of the present invention;

FIG. 14 illustrates a representative graphical user interface of an order detail screen of the present invention;

FIG. 15 illustrates a representative graphical user interface of an order detail screen of the present invention;

DETAILED DESCRIPTION OF THE PREFERRED EMBODIMENTS

Various embodiments described herein enable collaboration between a customer and the manufacturer of memorials. The memorials can be cast bronze products of a bronze foundry, such as grave markers; however, the invention also can be used for products such as awards, trophies and plaques. The collaboration between the customer and the manufacturer takes place over the Internet via web-based collaboration tools. An extended collaboration environment is set up between affiliated funeral homes and a manufacturer. Collaboration is the interaction between multiple parties, as in the funeral home interacting with the client as the seller of memorials; the funeral home then takes the memorial and enters into the automated system for design and manufacture by the seller of memorials.

By allowing a customer to participate in the configuration of a memorial, the present invention can provide a system and method that can be streamlined, workflow with the order proceeding directly to production. The present invention allows customers to take responsibility for graphical imaging at the time the order is placed and does not rely on traditional mail or fax systems. Also, with the present invention, an order can be trackable with an order number supplied when the order is placed in the system. Collaboration software includes having a customer give required information when placing the order, and targeted marketing or education of the user is possible because the customer is already visiting the supplier website.

Definitions used herein include the functional resources of a buying organization form a funeral home. The funeral home has a system computer that is engineered to connect to the seller's online system. As used herein, an online system can be used by vendors, contractors, distributors, manufacturers, funeral homes, lay people and anyone else that has a relationship with the organization. Further, a manufacturer may supply items or services to the customer.

Figure 1:
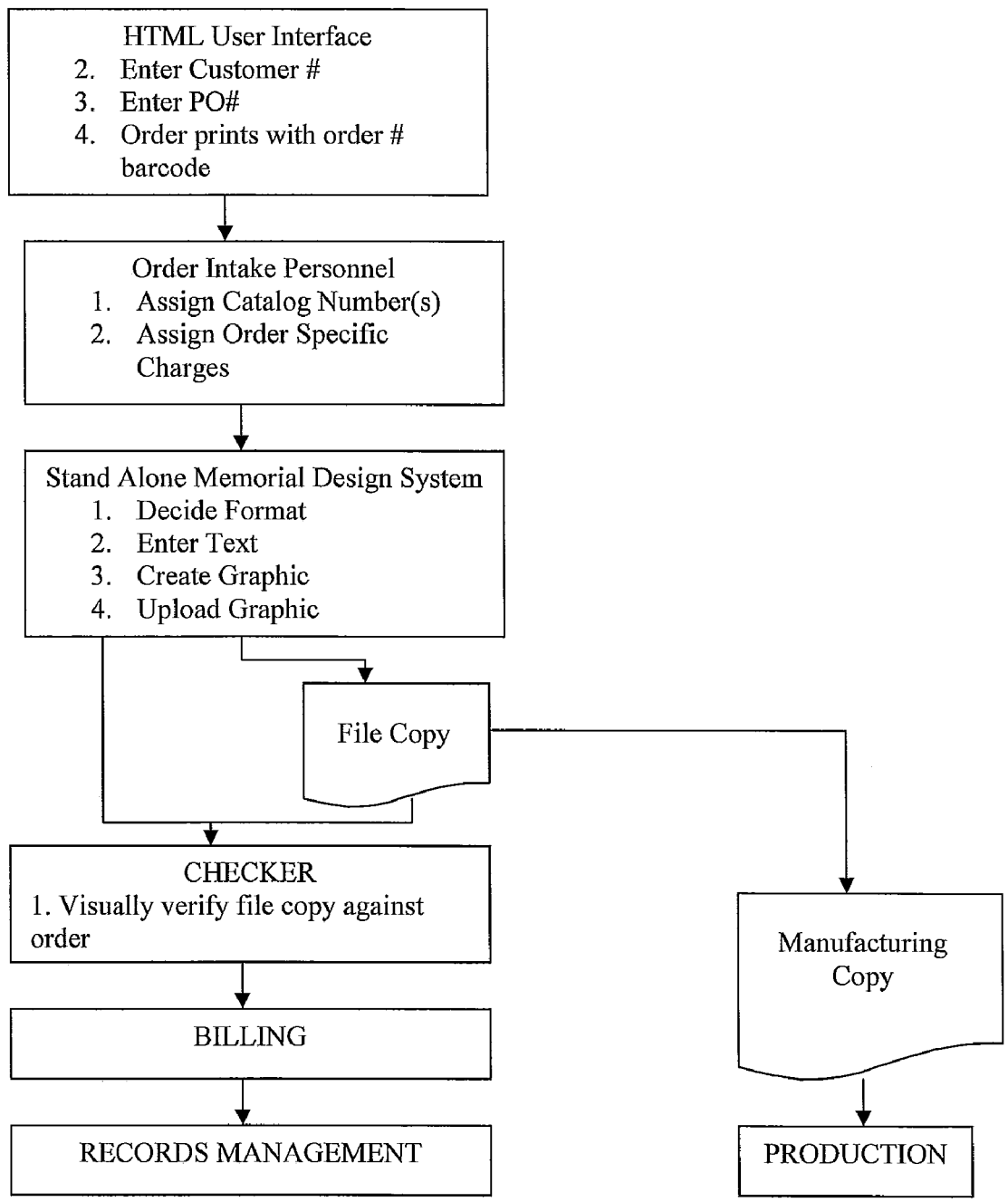
FIG. 1 is a step diagram of a prior art memorial design system.
Figure 2:
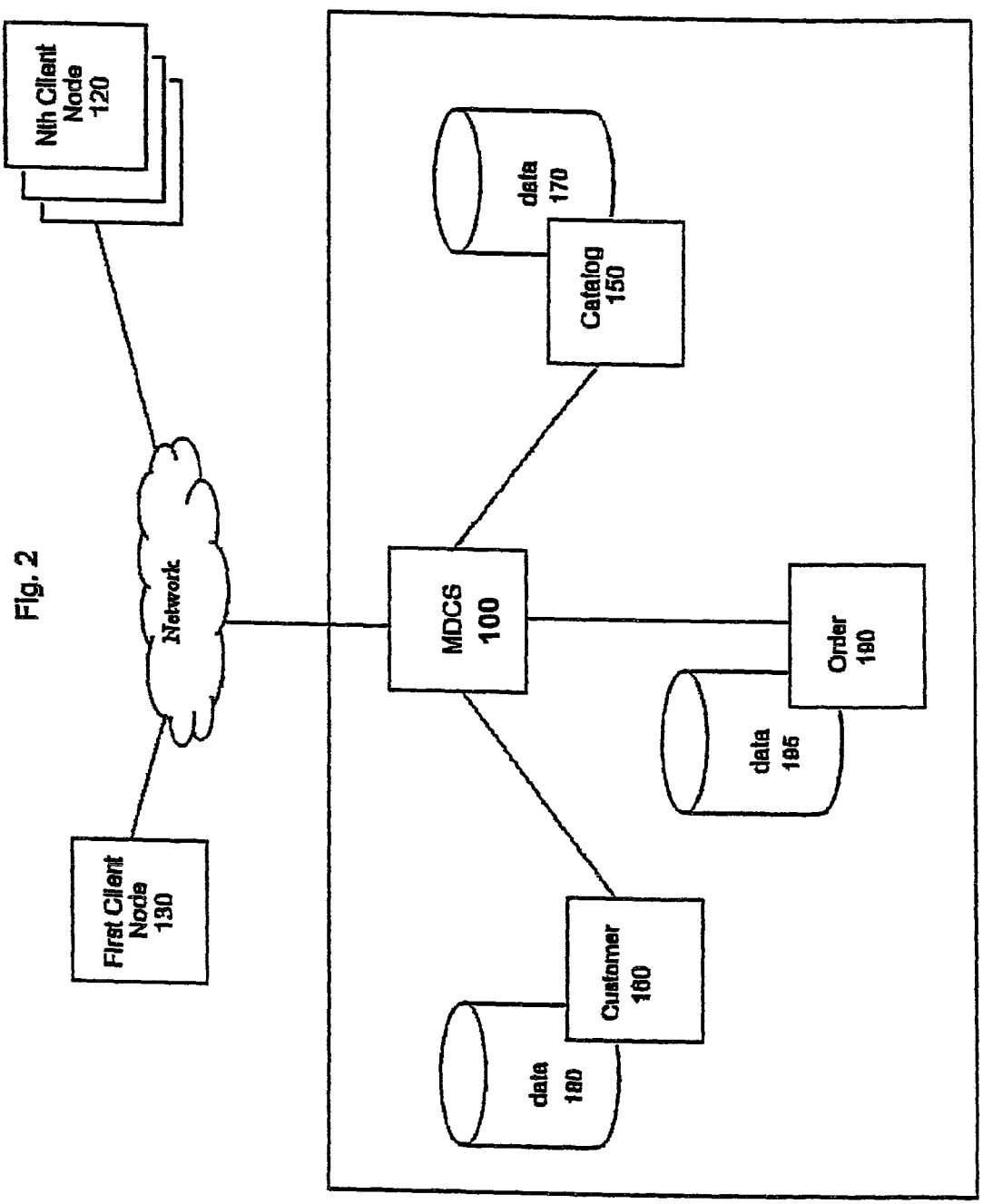
FIG. 2 illustrates a general schematic of a system for online memorial order placing.
Figure 22:
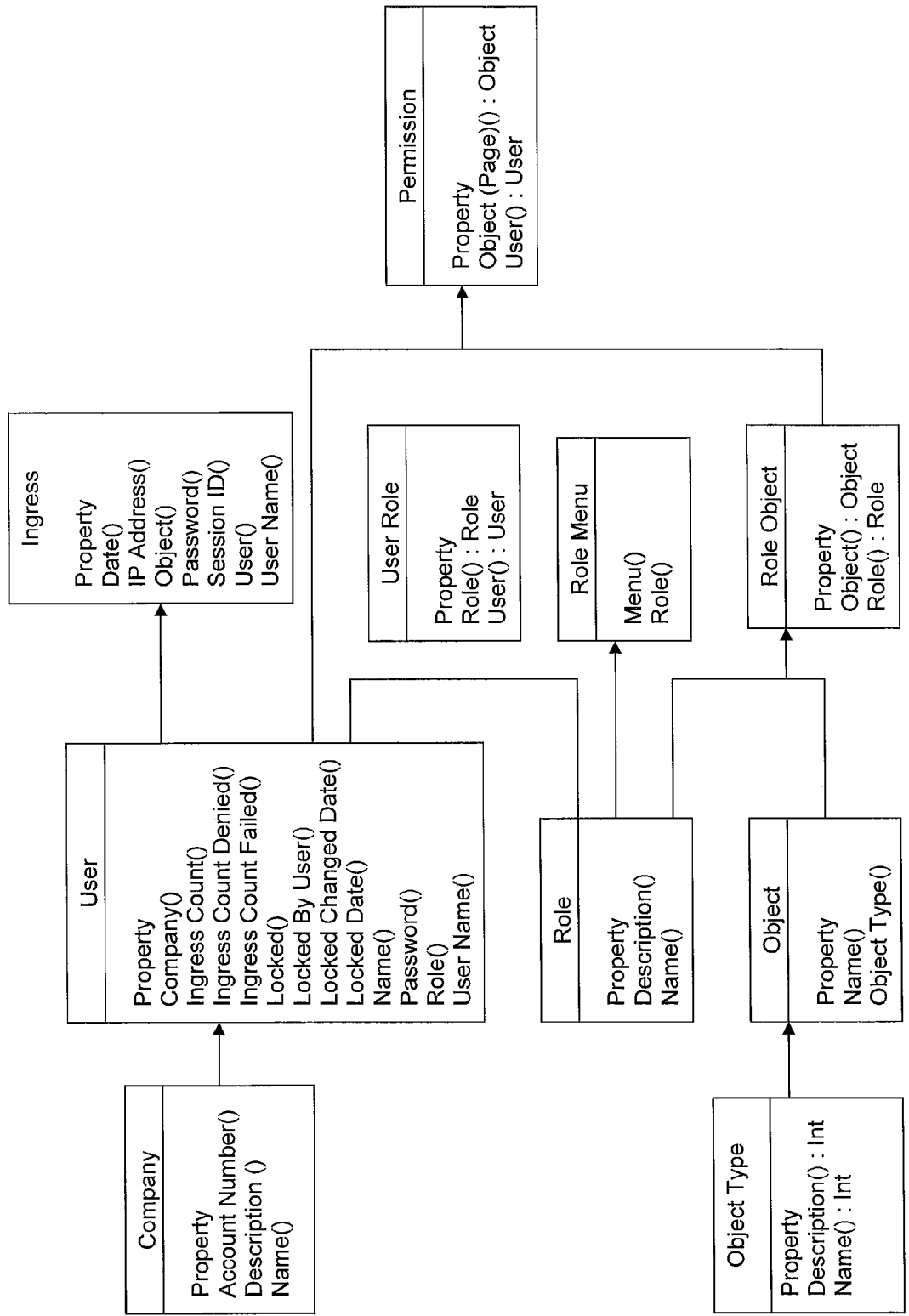
FIG. 22 is a diagram of a database for the present invention.
Figure 23:
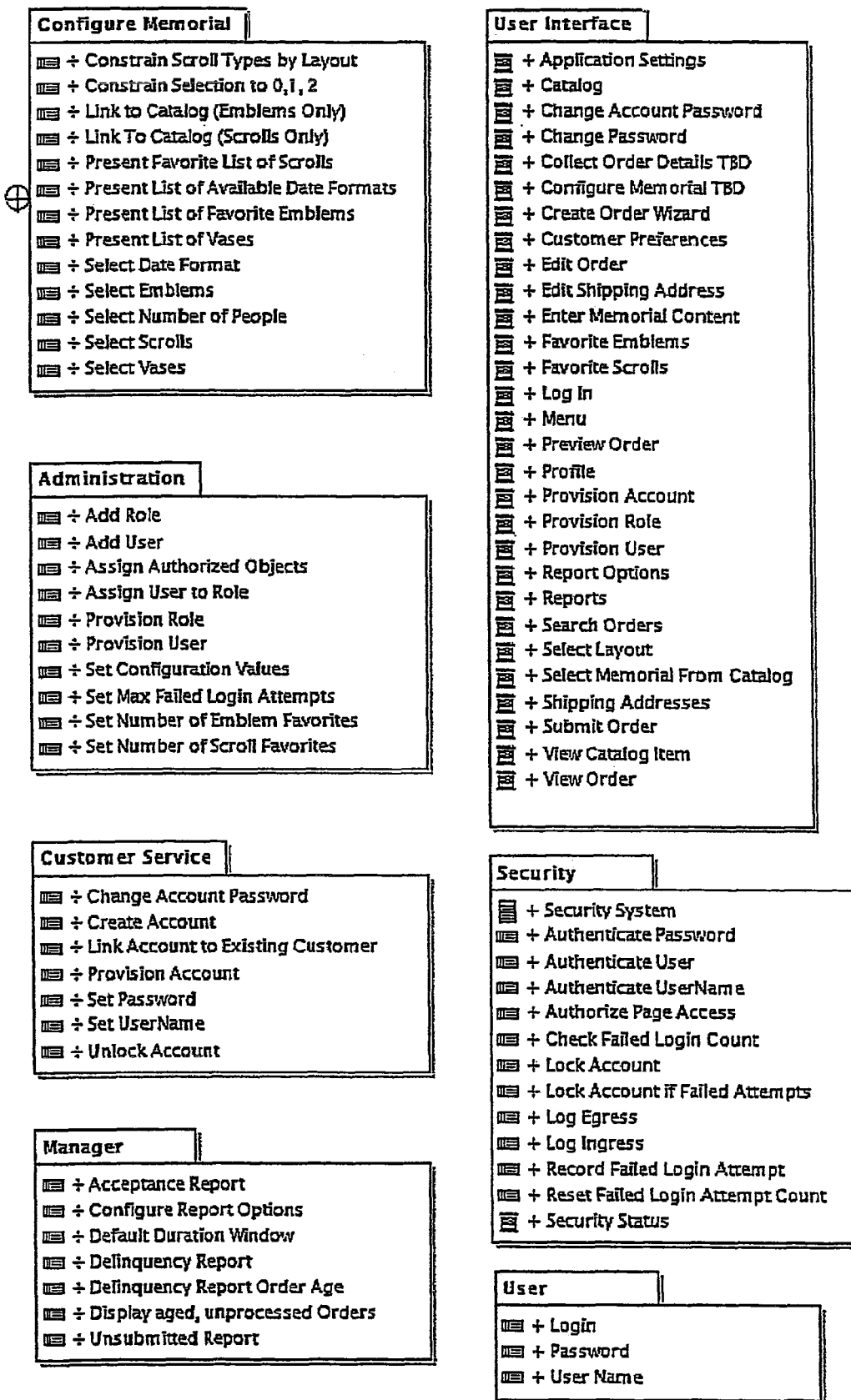
FIG. 23 is a diagram of a database for the present invention.
Figure 3:
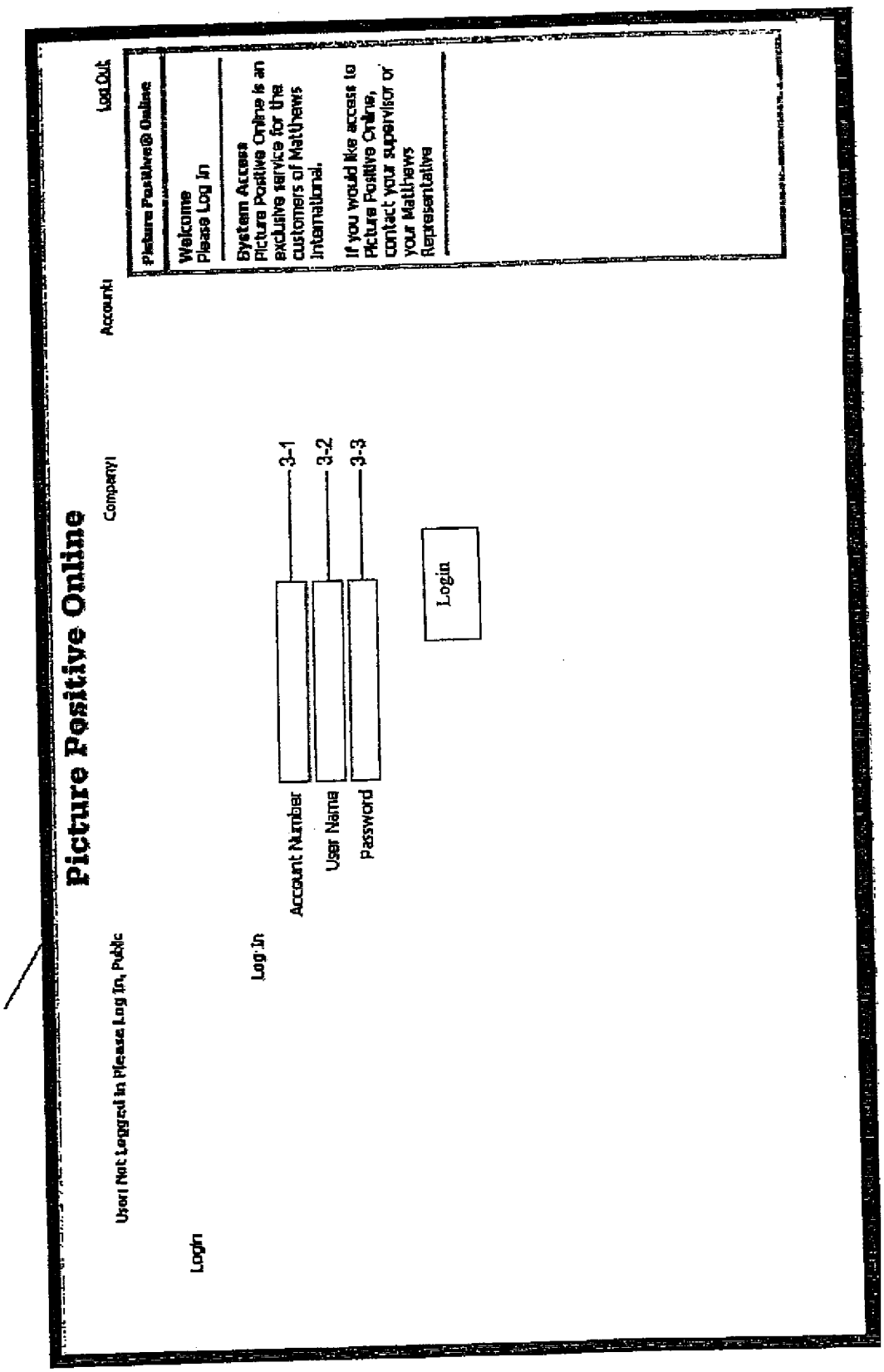
Figure 6:
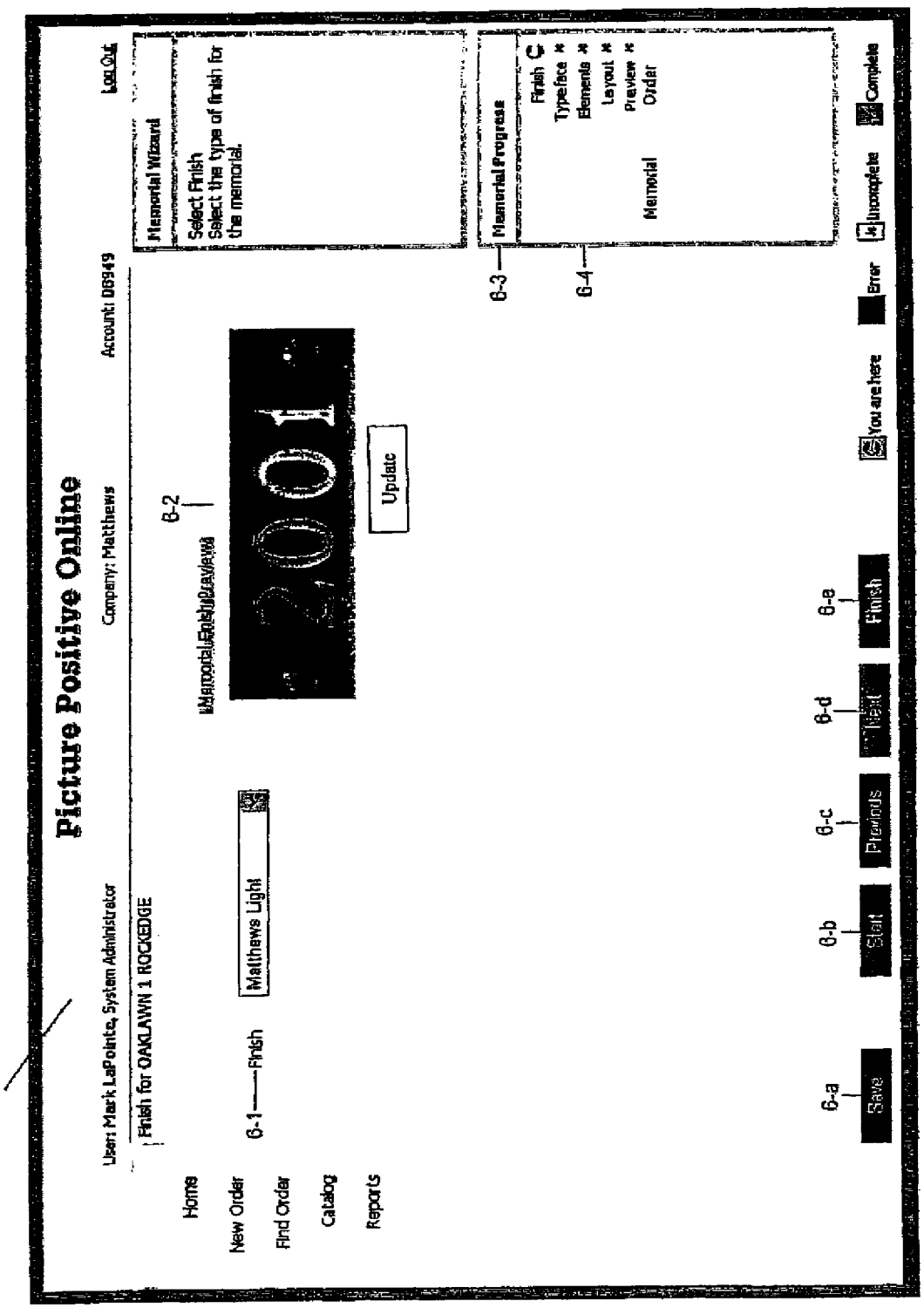
Figure 7:
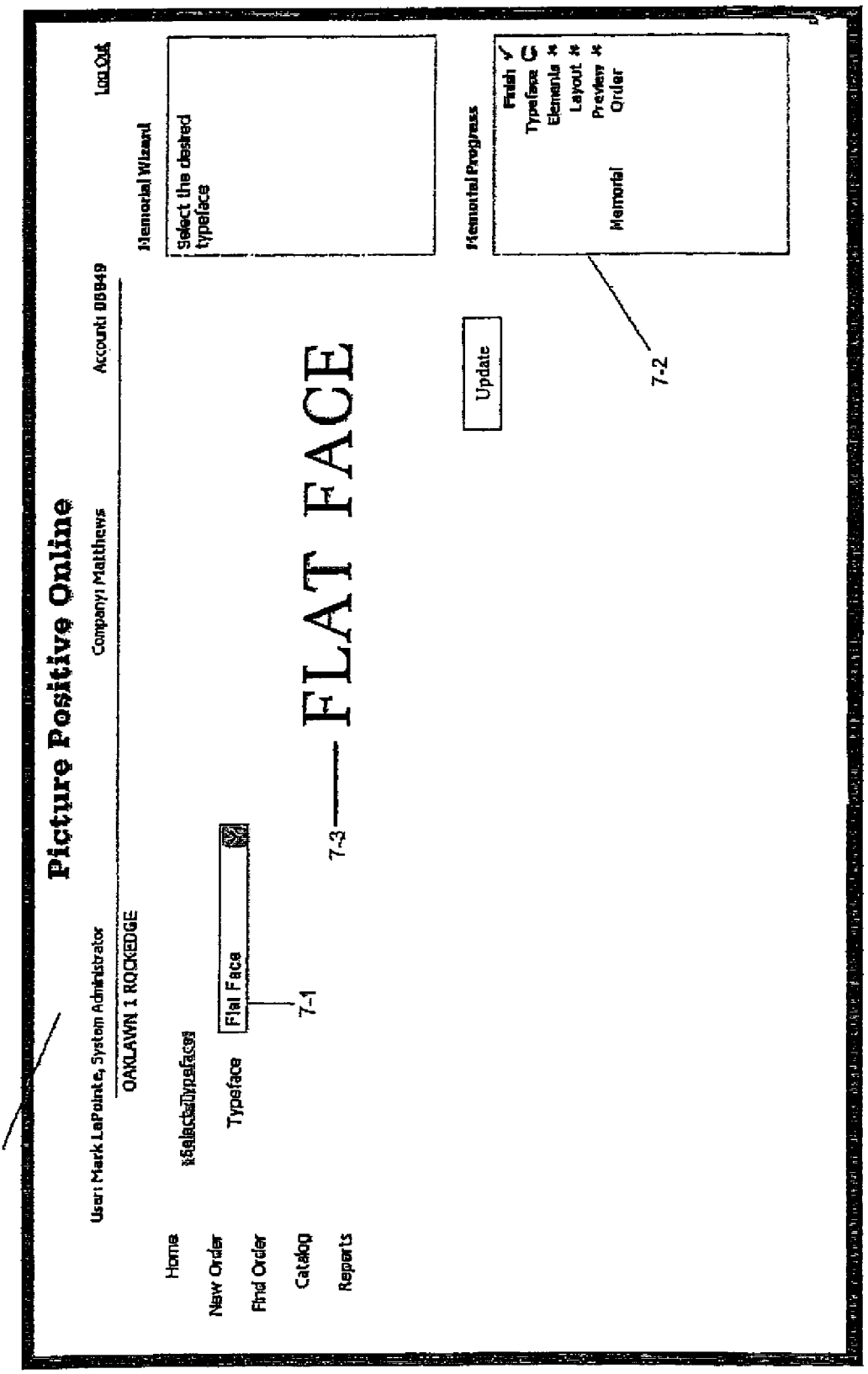
Figure 9:
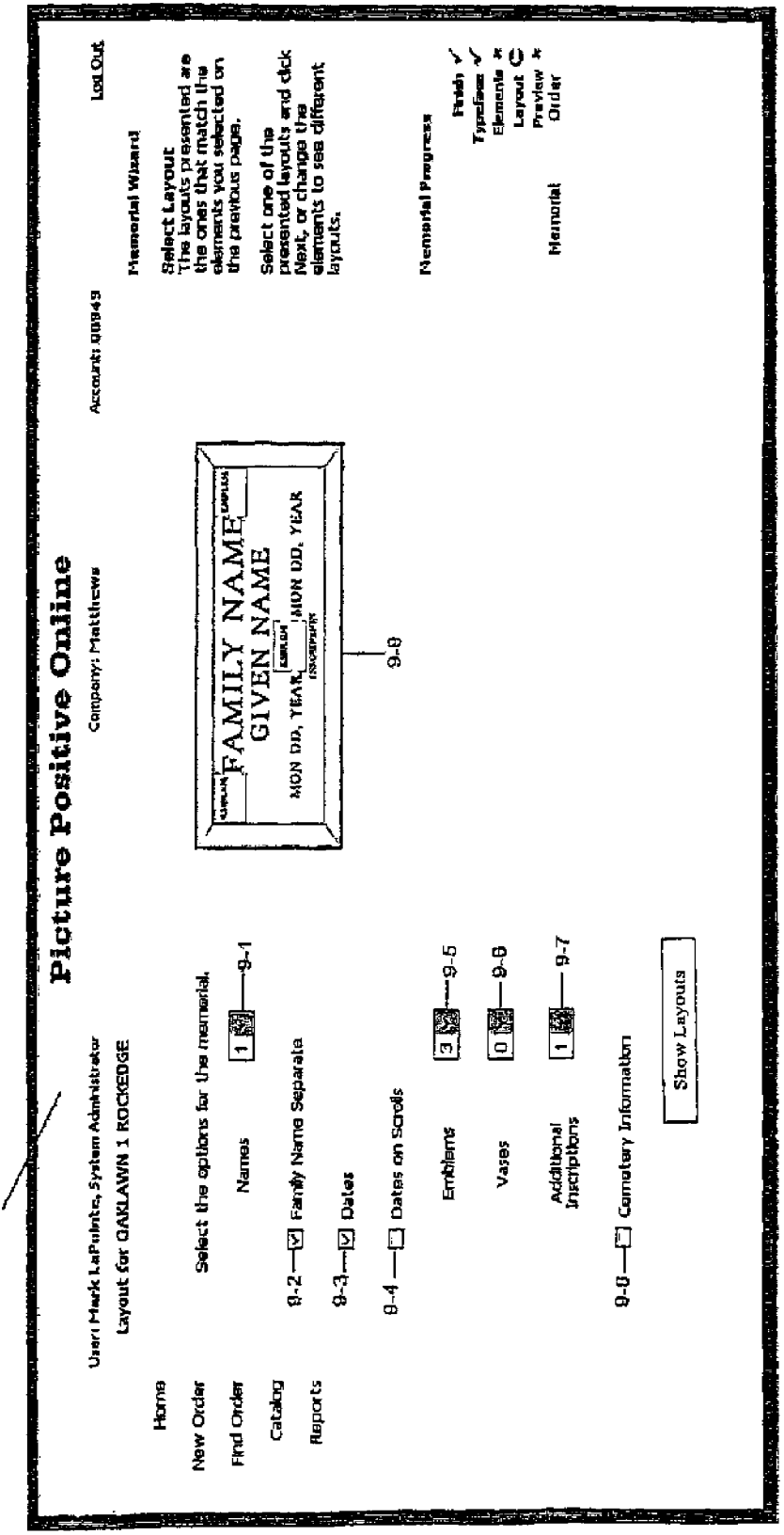

FIG. 2 illustrates one embodiment of a memorial design and collaboration system (MDCS) 100. The MDCS 100 includes multiple modules 150, 160 and 190. The MDCS 100 represents the collaboration network with integration between modules 150, 160 and 190. The extended system includes resources ranging from individuals who are customers to funeral homes or other functional groups within nodes 120 and 130. The resources at nodes 120 and 130 can be granted permission to access the MDCS 100 by a system administrator that can be located at MDCS 100. The system administrator can grant resources at nodes 120 and 130 access to the MDCS 100 by registering each resource on the MDCS 100 and identifying each resource by a resource name, functional position, company and/or division within a company, e-mail address, phone number, facsimile number and/or physical address. Upon registration, the system may transmit an e-mail notification to the resource. The e-mail can include a hyperlink to access the MDCS 100 and the resource identification number and/or password to provide the user access to the system. Throughout the description, functional resources, users and customers are used interchangeably to refer to resources that can be located at any one of the nodes 120 and 130. MDCS 100 may be referred to as a host processing node that enables secured collaboration. The nodes 120 and 130 can represent one or more funeral parlor organizations whose function is to purchase items from manufacturers within MDCS 100. MDCS 100 can secure a catalog module 150 for use by nodes 120 and 130. Client nodes 120 and 130 can also access the MDCS 100 online screens for a customer module 160 entry and order module 190 entry. With reference to FIG. 22 and continuing reference to FIG. 2, an example of a data structure is shown, diagramming the data 170 layout for a catalog module 150. With reference to FIG. 23 and continuing reference to FIG. 2, an example of a database structure is shown, diagramming an order 190 having data 195. With reference to FIG. 23 and continuing reference to FIG. 2, an example of data 180 is shown that can be used for a customer module 160.

Figure 3:
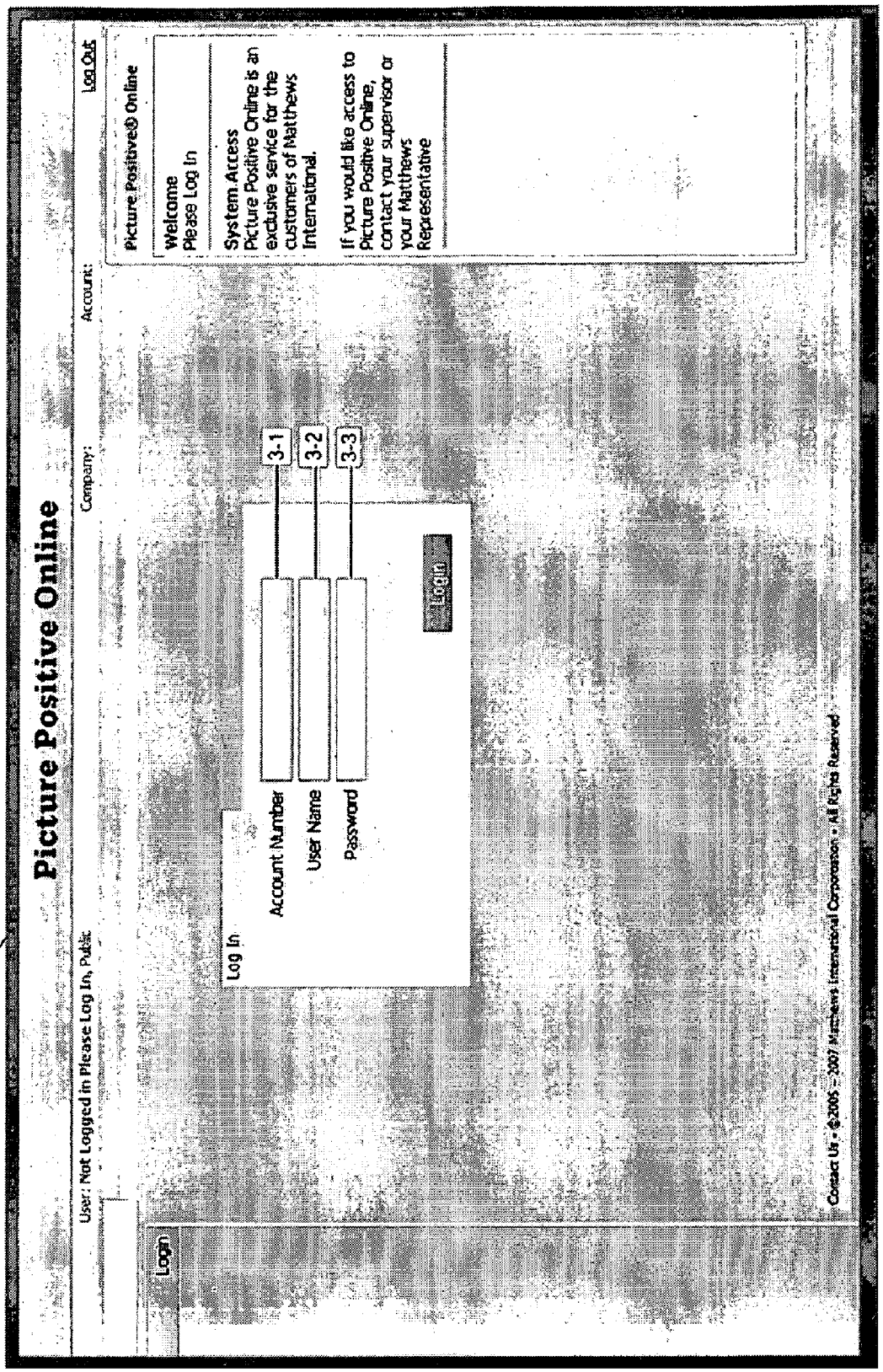
FIG. 3 illustrates a representative graphical user interface of a login screen of an embodiment of a memorial design and manufacture system. MDCS online login screen 3-0 is for displaying login information.

With reference to FIG. 3, a MDCS online login screen 3-0 is shown. MDCS online login screen 3-0 is for displaying login information. Login screen 3-0 includes account number 3-1, user name 3-2 and password 3-3.

Figure 4:
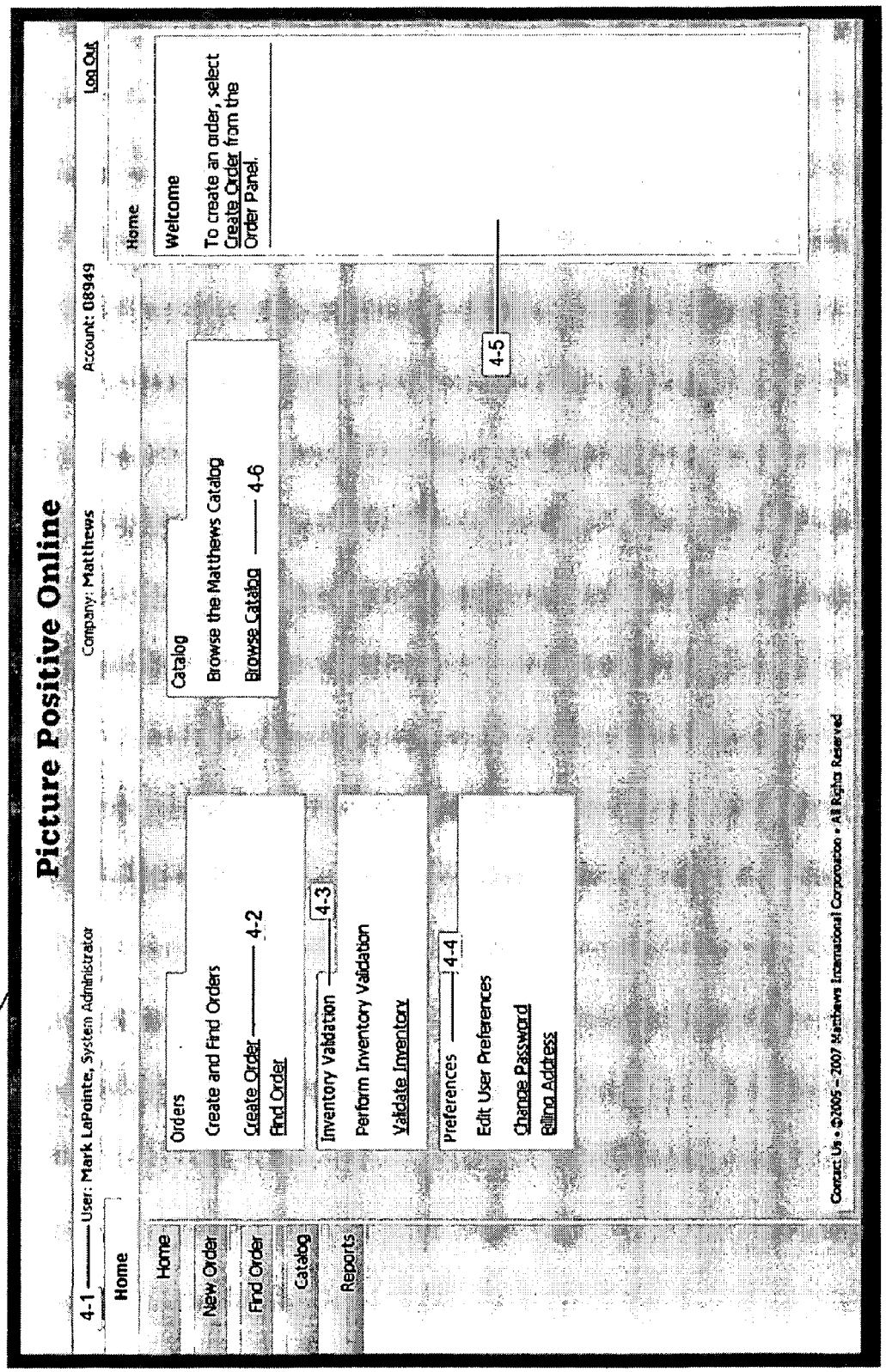
FIG. 4 illustrates a representative graphical user interface for administration of an embodiment of the present invention.

With reference to FIG. 4, a MDCS online administration screen 4-0 is shown. MDCS online administration screen 4-0 allows the user to administer changes to the configuration of the MDCS online system. MDCS online administration screen 4-0 includes fields for create order 4-2, validate inventory 4-3, edit preferences 4-4 and an information bar 4-5. The field for create order 4-2 can be used by a customer for creating an order link to configure and order a memorial. Validate inventory 4-3 presents items appropriate for a configured user. In addition, along the top of the MDCS online administration screen 4-0 is the user information 4-1 showing the user name and the user's security level for access as an individual into the system, as well as the company and account information.

Figure 5:
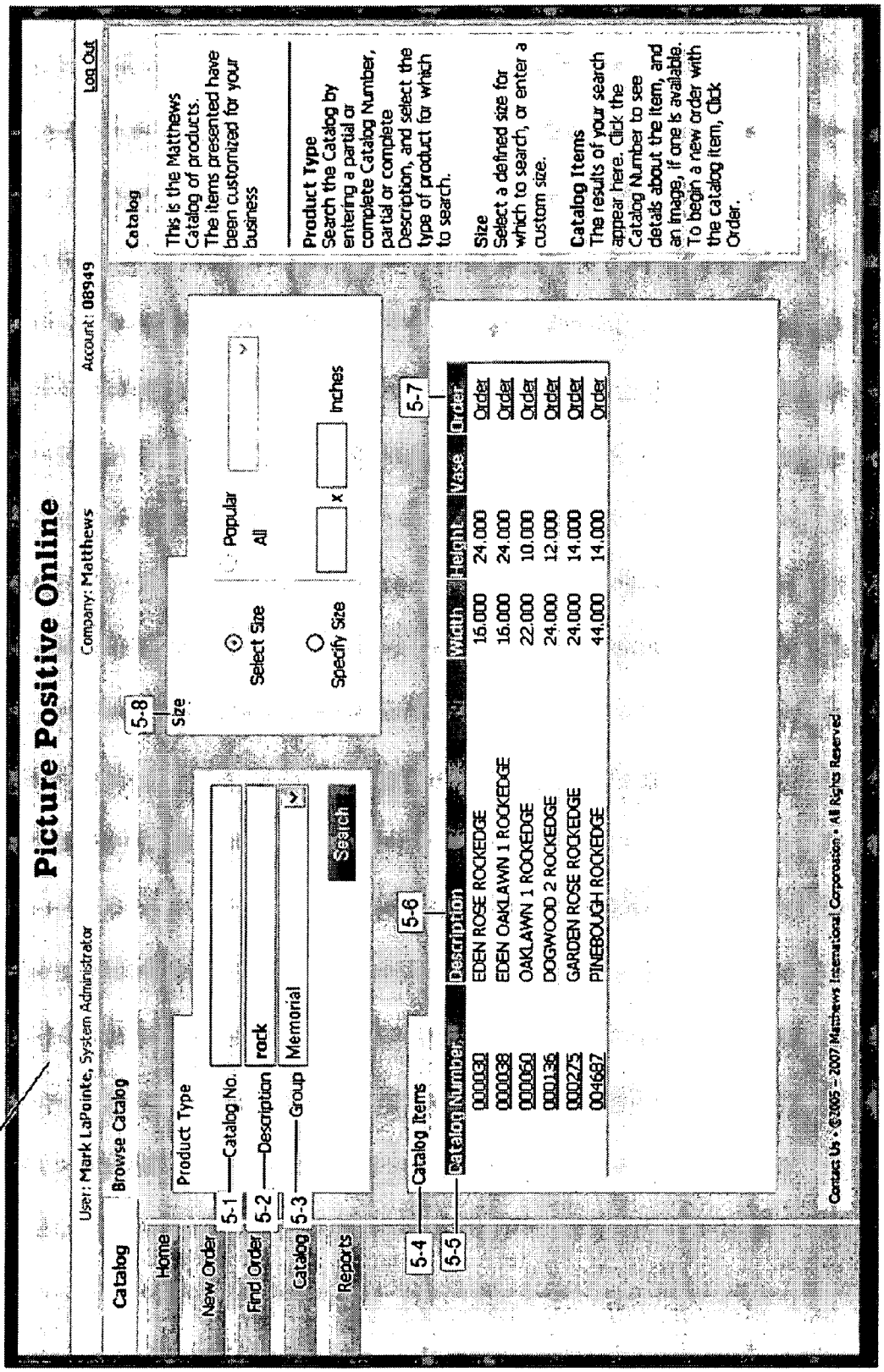
FIG. 5 illustrates a representative graphical user interface of a catalog screen of an embodiment of the present invention.

With reference to FIG. 5, a MDCS online catalog screen 5-0 is shown. MDCS online catalog screen 5-0 allows the user to provide catalog choices for configuring the MDCS online system. The MDCS online catalog screen 5-0 includes fields for a catalog number 5-1, description 5-2 and group 5-3. The fields for catalog number 5-1, description 5-2 and group 5-3 allow the user to configure a search for items in the MDCS online catalog screen 5-0. In addition, the MDCS online catalog screen 5-0 provides a list of catalog items 5-4 each containing fields for a catalog number 5-5, catalog item description 5-6 and an order link 5-7. The catalog number 5-5 allows a user to read details and see an image of the product if clicked. The catalog item description 5-6 is presented displaying only items allowed to the security level of the user. The order link 5-7 provides a link to the screen to create an order and configure the item that has been selected. On the MDCS online catalog screen 5-0, a search of the catalog can be accomplished by entering information into the catalog number 5-1, either partial or complete names or words or by selecting the type of product for which to search. In addition, the MDCS online catalog screen 5-0 includes the size 5-8 given in order to allow the user to define the size for which to search. As shown in FIG. 5, a select size or a specific size can be entered into the respective boxes. After a search is completed, the results of the search appear in the catalog items 5-4 window. The user should click on the catalog number 5-5 to see an image of the product or details about the items. The user should click on the order link 5-7 in order to begin a new order, which includes that catalog item of that row.

Figure 6:
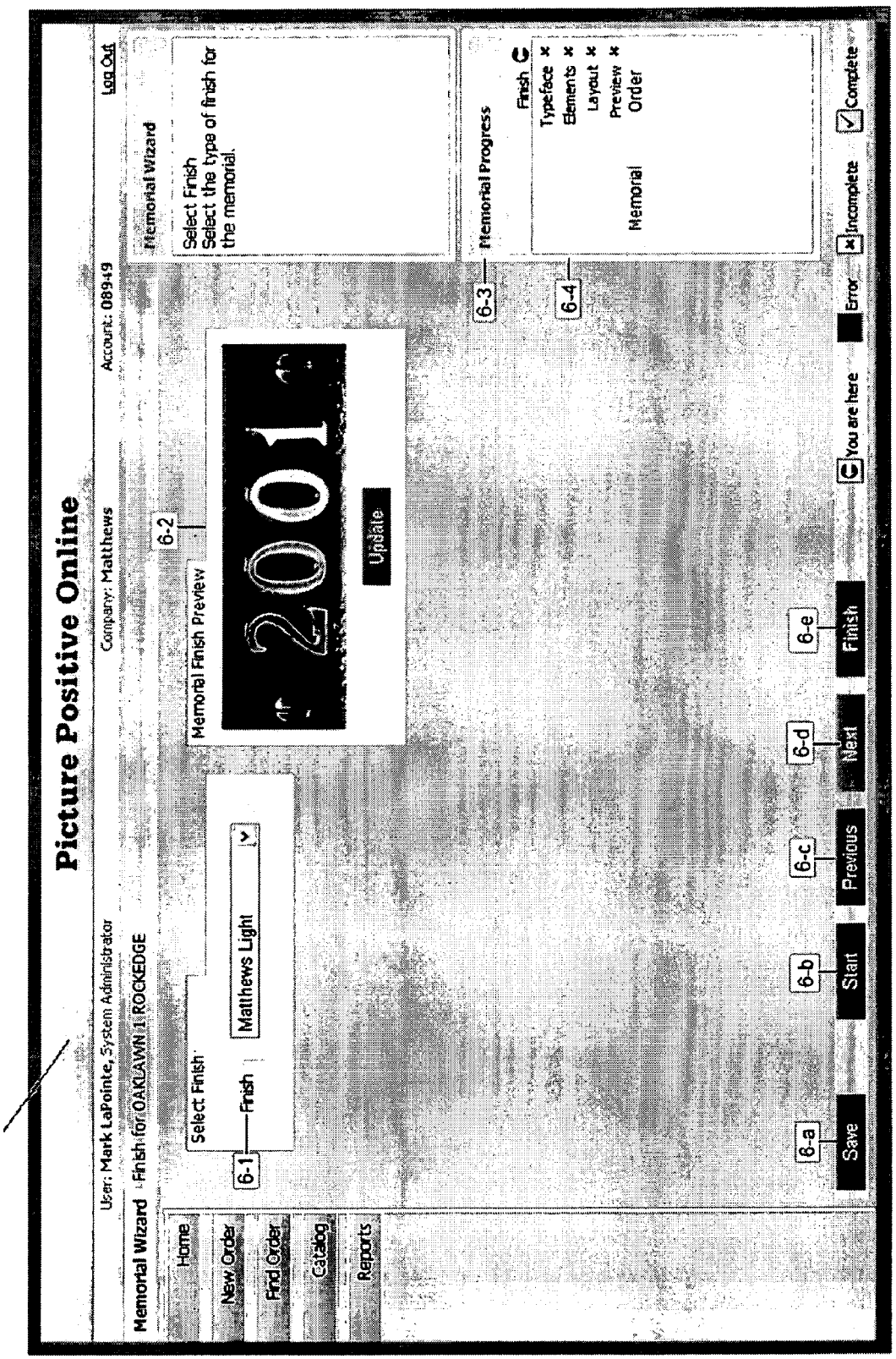
FIG. 6 illustrates a representative graphical user interface of a finish screen of an embodiment of the present invention.

With reference to FIG. 6, MDCS online finish screen 6-0 is shown. MDCS online finish screen 6-0 allows the user to configure the type of finish that will be used on the memorial. MDCS online finish screen 6-0 includes fields for a finish selection window 6-1 and a memorial finish preview window 6-2. The select finish window 6-1 is for choosing a final surface type from a list of finishes in a drop-down box of the select finish window 6-1. The memorial finish preview window 6-2 allows the user to see a visual representation of the finish selected. This memorial preview window 6-2 can be updated as needed. In addition, MDCS online finish screen 6-0 includes a memorial progress bar 6-3, a progress meter 6-4 and a save button 6-A, a start button 6-B, a previous button 6-C, a next button 6-D and a finish button 6-E. These navigation buttons allow navigation to the next or previous steps in the memorial configuration process and also allow the user to save and finish the process. The memorial progress bar 6-3 displays the steps required to configure the memorial. It also indicates the current position in the process of configuring the memorial. The progress meter 6-4 allows the user to move forward or backward in the process by clicking an item in the progress meter 6-4. As shown, the items in the MDCS online screen 6-0 include typeface, elements, layout and preview. Rendering takes place after the user has selected their formats, patterns and text. The text is rendered, meaning it is positioned on the image. The image can have a number of different patterns placed on top of it, as well as text. The present invention provides layered images allowing infinite combinations of memorials and if the user desires to remove a layer it can be done without having to start over on the graphical design. In other words, if the layers are placed on an image, many different components can be added. In a bronze memorial, background color, for example shades of brown, can be added. The pattern determines where the bronze and green is showing up.

Figure 7:
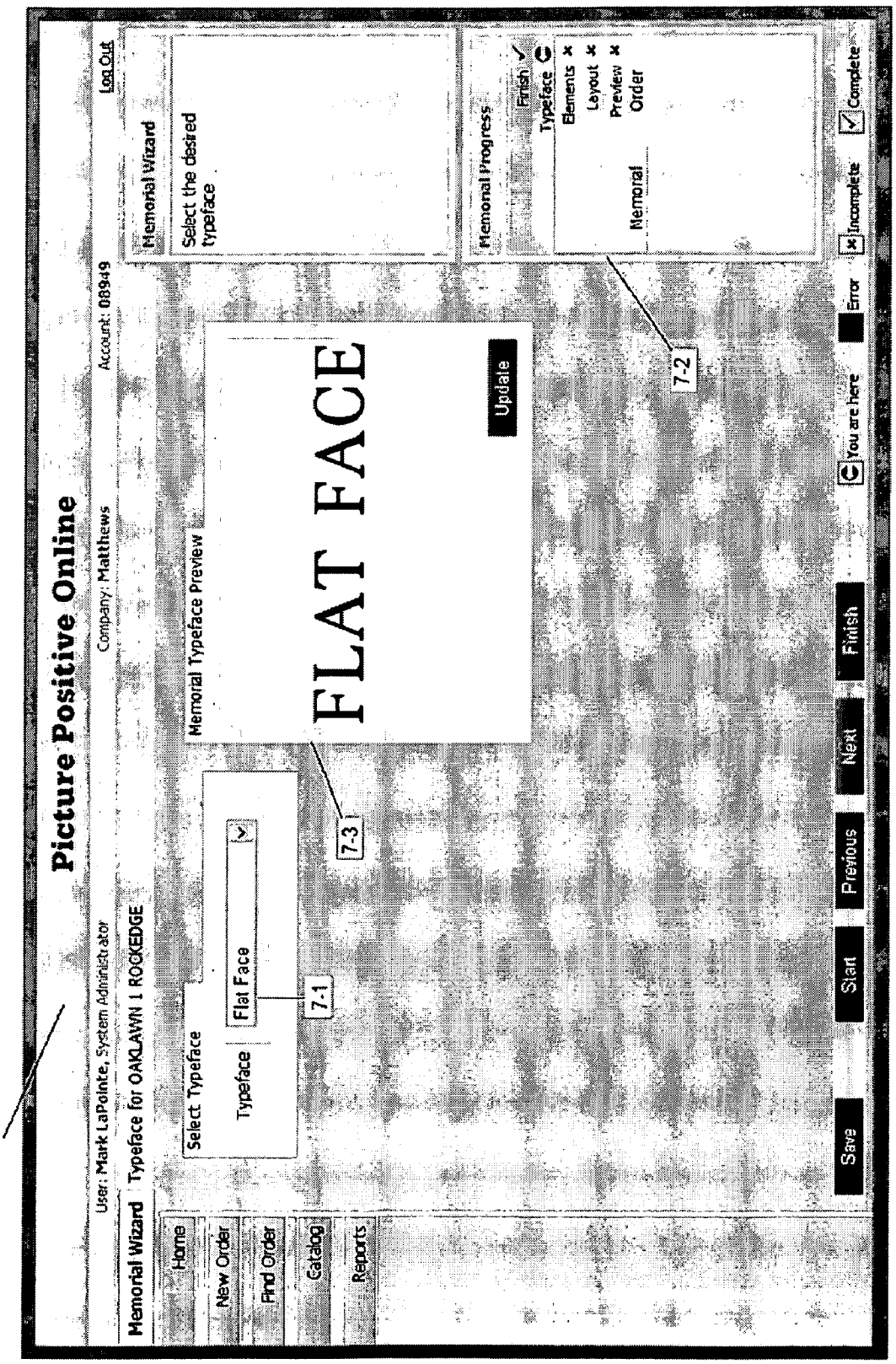
FIG. 7 illustrates a typeface screen according to the present.

Once the customer has chosen a catalog number 5-4 by choosing the button for order 5-7, with reference to FIG. 6, the MDCS online finish screen 6-0 is presented to the customer. As shown in FIG. 6, the memorial preview 6-2 shows the Oaklawn/Rockedge item. The item in the memorial preview is the base upon which other objects or layers will be added. For example, in the finish screen 6-0, a finish 6-1 can be applied to the base item. After choosing a finish, the customer is presented with choices regarding typeface on typeface screen 7-0 as shown in FIG. 7. Then, the customer is choosing people, dates, emblems and inscriptions on the people and dates screen 8-0, shown in FIG. 8. Every one of these is layered on the base image.

With reference to FIG. 7, a MDCS online typeface screen 7-0 is shown. The MDCS online typeface screen 7-0 allows the user to choose a specific typeface for their memorial. The MDCS online typeface screen includes a typeface window 7-1 and a memorial preview 7-3. The typeface window 7-1 can be used to select a typeface or font for the memorial, the typefaces are displayed in a drop-down box and are shown flat face or oval face under typefaces available on the MDCS online typeface screen 7-0, however any typeface known in the art can be used and made available to the users. Once the user selects a typeface, the memorial preview 7-3 can be updated to show the effects.

Figure 8:
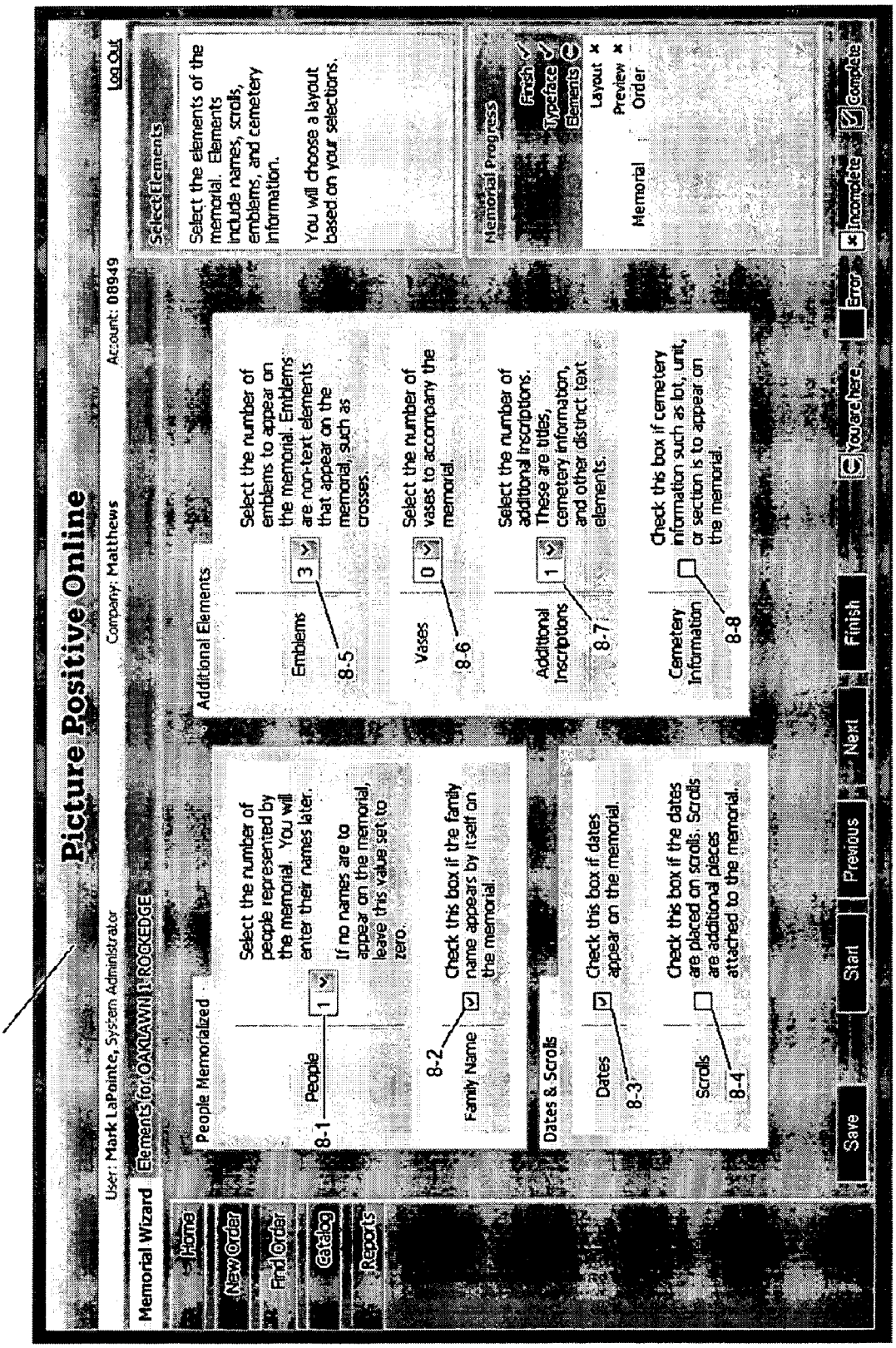
FIG. 8 illustrates a representative graphical user interface of a people and dates screen of the present invention.

With reference to FIG. 8, a MDCS online people and dates screen 8-0 is shown. The MDCS online people and dates screen 8-0 allows the user to add people and dates or other elements to the memorial. MDCS online people and dates screen 8-0 includes fields for people memorialized including people 8-1 and family name 8-2. People 8-1 can be used to select the number of people represented by the memorial. The names can be entered into the system and displayed. Family name 8-2 should be configured if the family name is to appear on the memorial. The dates and scrolls 8-3 and 8-4 can be used to configure dates to appear on the memorial and to place the dates on a scroll. Scrolls are additional pieces attached to the memorial. The MDCS online people and dates screen 8-0 further include fields for additional elements, including emblems 8-5, vases 8-6, additional inscriptions 8-7 and cemetery information 8-8. Emblems 8-5 can be configured to select the number of emblems which will appear on the memorial. The emblems are non-text elements that appear on the memorial, such as crosses. The vases 8-6 can be configured to select the number of vases to accompany the memorial. The additional inscriptions 8-7 can be configured to select the number of additional inscriptions on the memorial. These inscriptions can be titles, cemetery information and other distinctive text elements. Cemetery information 8-8 can be checked if the cemetery information such as lot, unit or section is to appear on the memorial.

Figure 9:
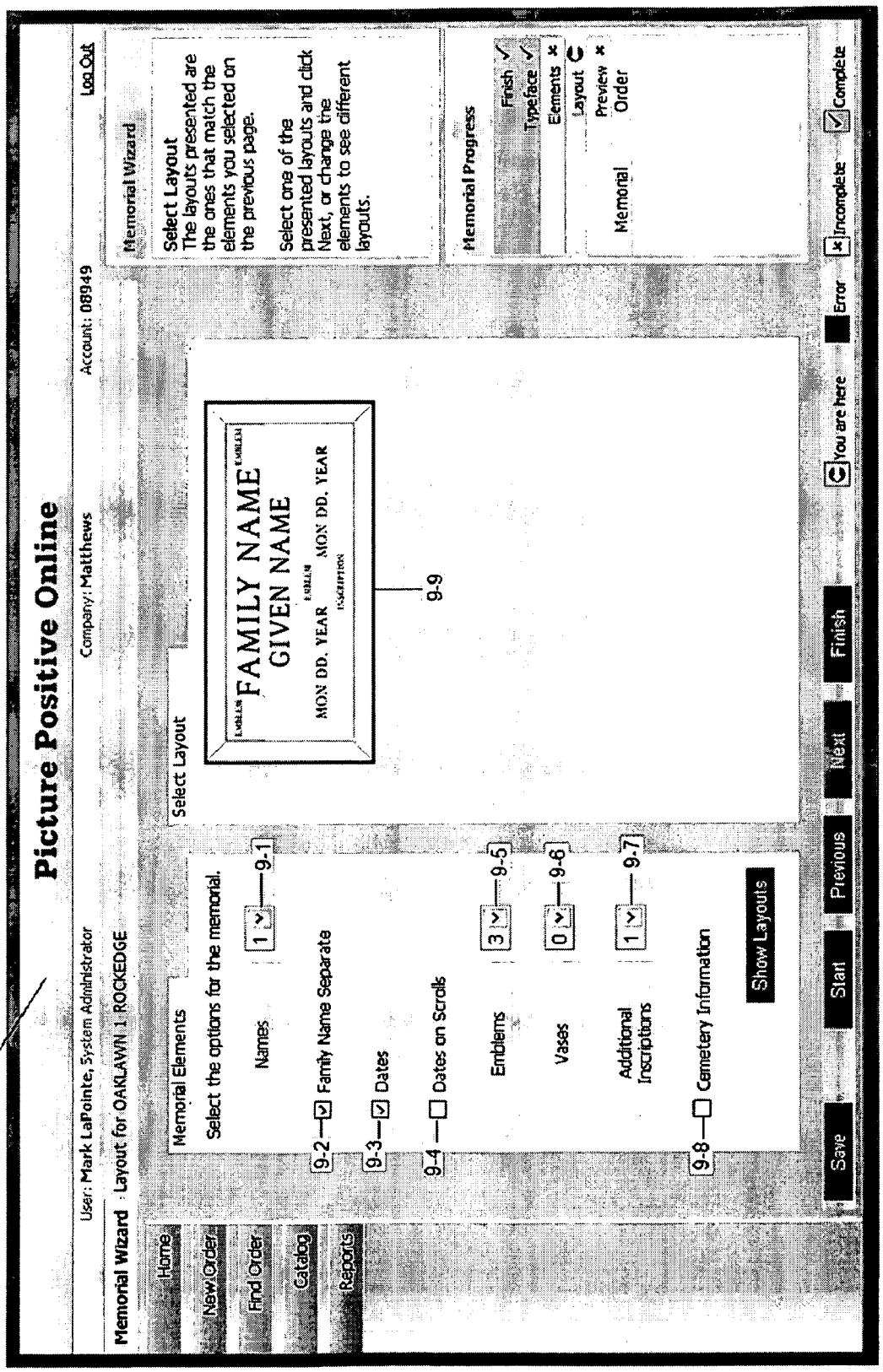
FIG. 9 illustrates a representative graphical user interface of the present invention.

With reference to FIG. 9, MDCS online memorial options screen 9-0 is shown. MDCS online memorial options screen 9-0 allows the user to select the layouts presenting the items that match the elements selected on the MDCS online people and dates screen 8-0. The user can step out of the present layout to change the elements and then preview the memorial as the process is being completed. The memorial elements that can be selected include names 9-1, family name separate 9-2, dates 9-3, dates and scrolls 9-4, emblems 9-5, vases 9-6, additional inscriptions 9-7 and cemetery information 9-8. After any of these are selected, the user can select to be shown the updated layout, which shows, in the memorial preview 9-9 to match the selected memorial elements and show them in the memorial preview 9-9.

Figure 10:
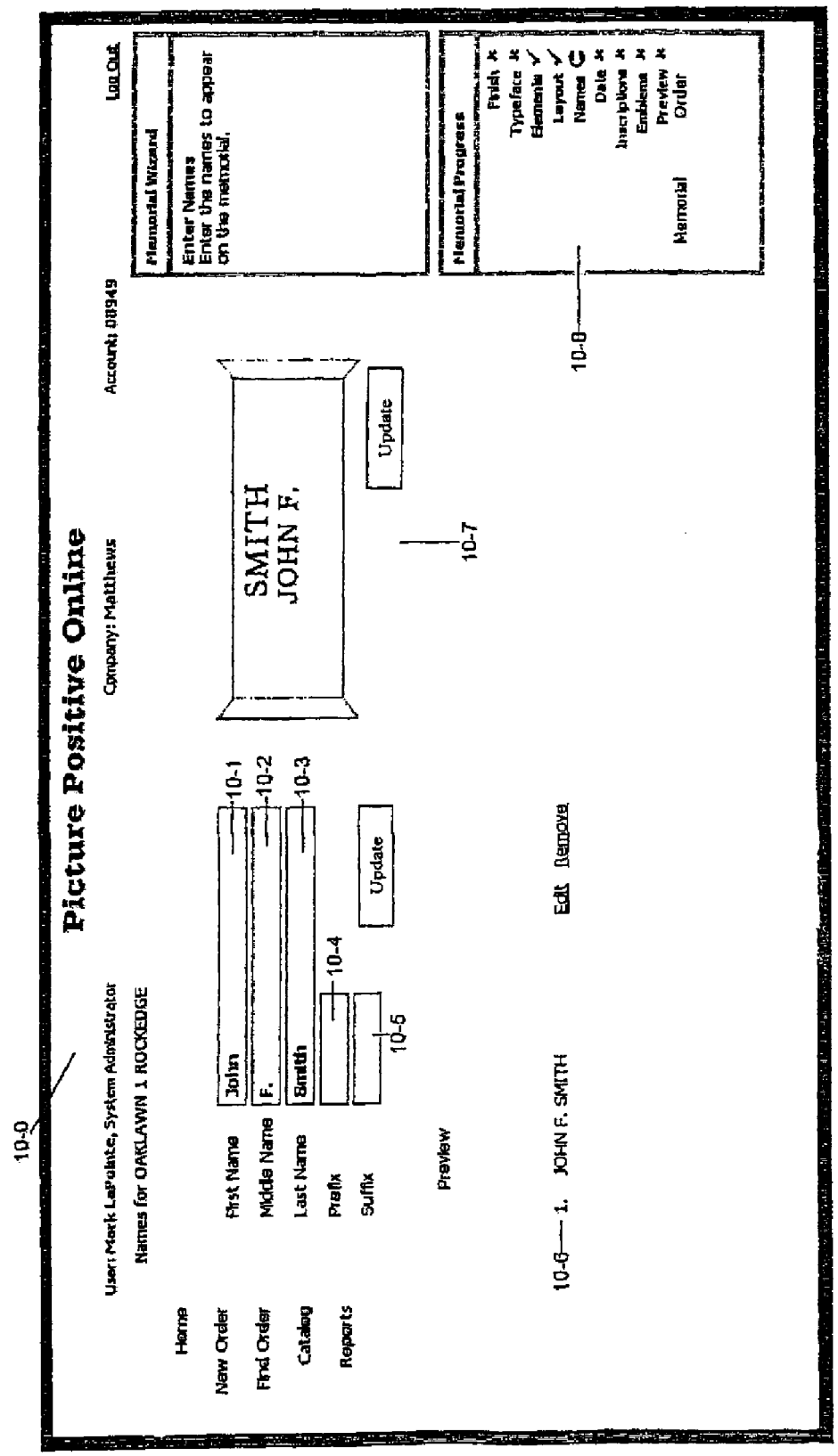
FIG. 10 illustrates a representative graphical user interface of a name screen of the present invention.

With reference to FIG. 10, a MDCS online name screen 10-0 is shown. MDCS online name screen 10-0 is for entering the names that will appear on the memorial. The MDCS online name screen 10-0 includes fields for first name 10-1, middle name 10-2, last name 10-3, prefix 10-4 and suffix 10-5 for entry of the names as they will appear on the memorial. The names entered will show up in the names on memorial 10-6. The user can edit or remove names that have been entered into names on memorial 10-6. The memorial preview 10-7 displays a representation of the memorial as the elements that will appear on the memorial are selected and configured. The user can select and enter additional names using the MDCS online names screen 10-0 and update the memorial preview 10-7 accordingly. The progress meter 10-8 shows the additional steps appropriate for the layout that the user is configuring.

Figure 11:
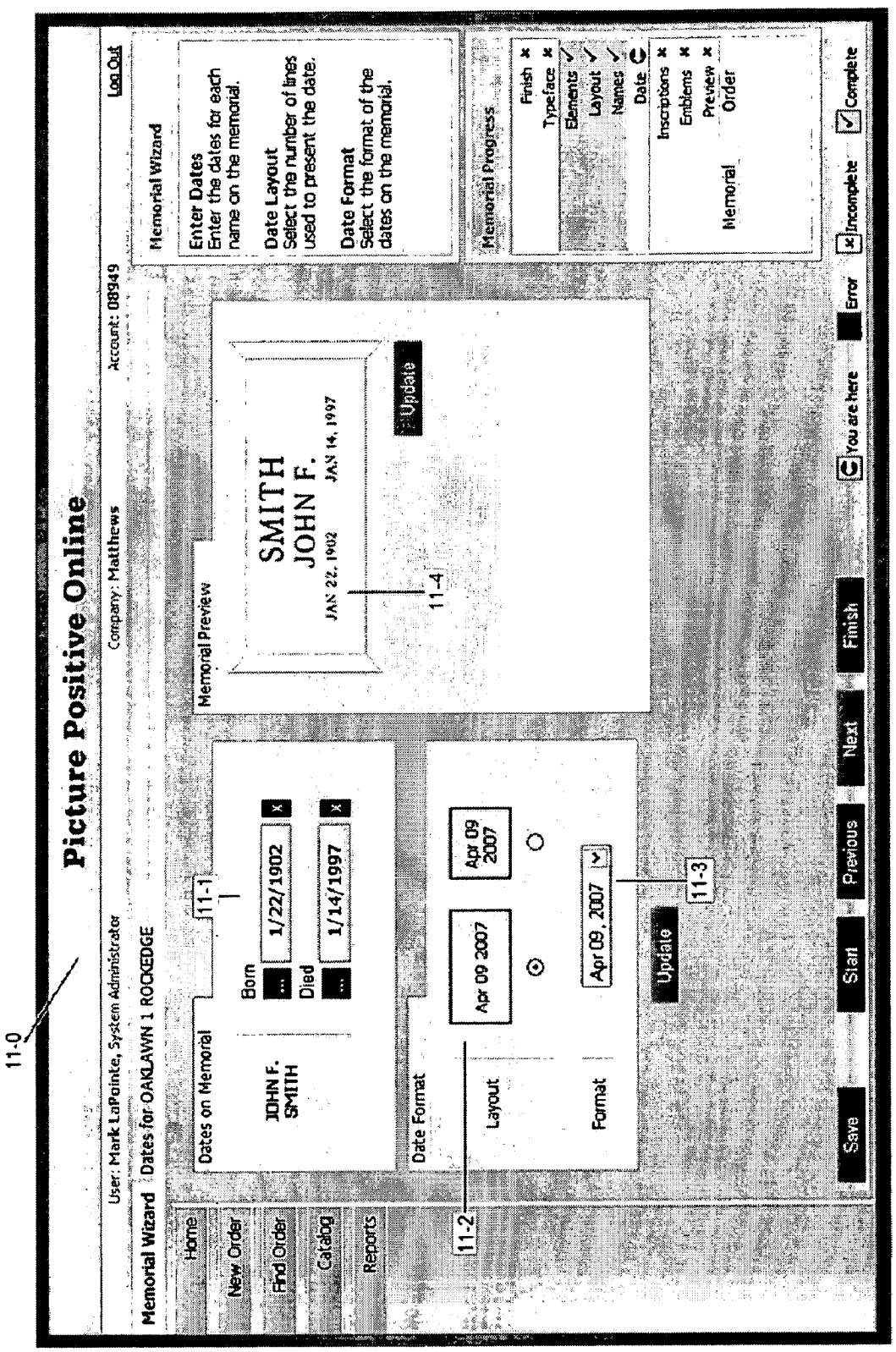
FIG. 11 illustrates a representative graphical user interface of a date entry screen of the present invention.

With reference to FIG. 11, a MDCS online date entry screen 11-0 is shown. A MDCS online date entry screen 11-0 is for entering the dates for each name on the memorial. A date entry screen 11-0 further allows the user to select the number of lines used to select the date. In addition, the date entry screen 11-0 allows the user to select a format for which the dates will show on the memorial. The dates on a memorial 11-1 can be used to select the born and death dates of each person memorialized. A layout 11-2 shows the dates that will be displayed on the number of lines selected. Date format 11-3 shows the punctuation style that the user has selected from the drop-down box list of the date format 11-3. Memorial preview 11-4 is updated accordingly to show the dates as they will appear on the memorial preview.

Figure 12:
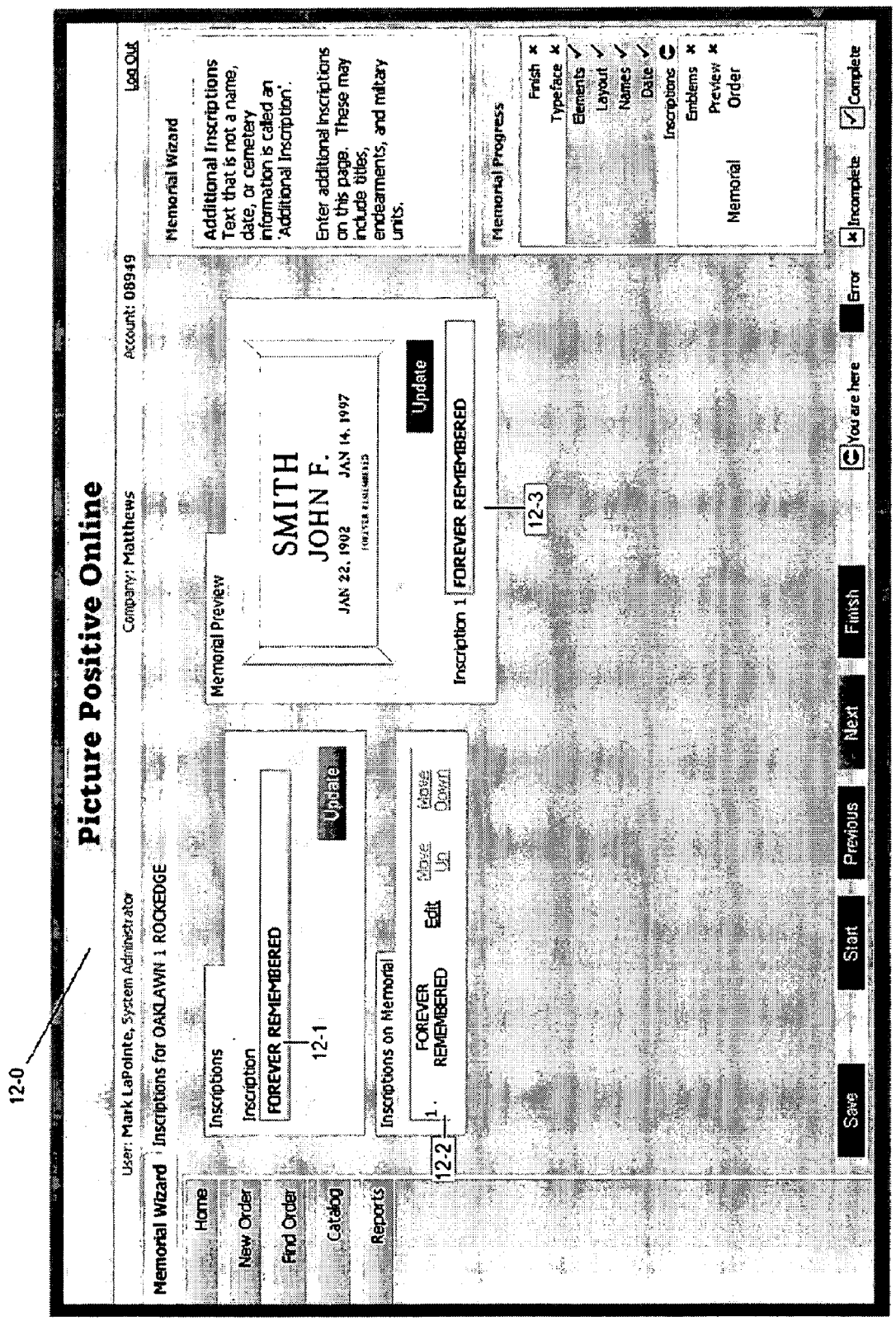
FIG. 12 illustrates a representative graphical user interface of an inscription screen of the present invention.

With reference to FIG. 12, a MDCS online inscription screen 12-0 is shown. The MDCS online inscription screen 12-0 is for entering additional inscriptions. Additional inscriptions can be text that is not a name, date or cemetery information. The additional inscriptions are entered and include various textual passages, which can be terms of endearment, military units, titles held or any other descriptive statement the user wishes to use. The MDCS online inscription screen 12-0 includes a field for an inscription 12-1 which a customer can enter an inscription to be displayed on the memorial. The inscription on a memorial 12-2 can show the entered inscriptions to be shown on the memorial from the inscription 12-1. A memorial preview 12-3 can be updated to show the progress of the configuration.

Figure 13:
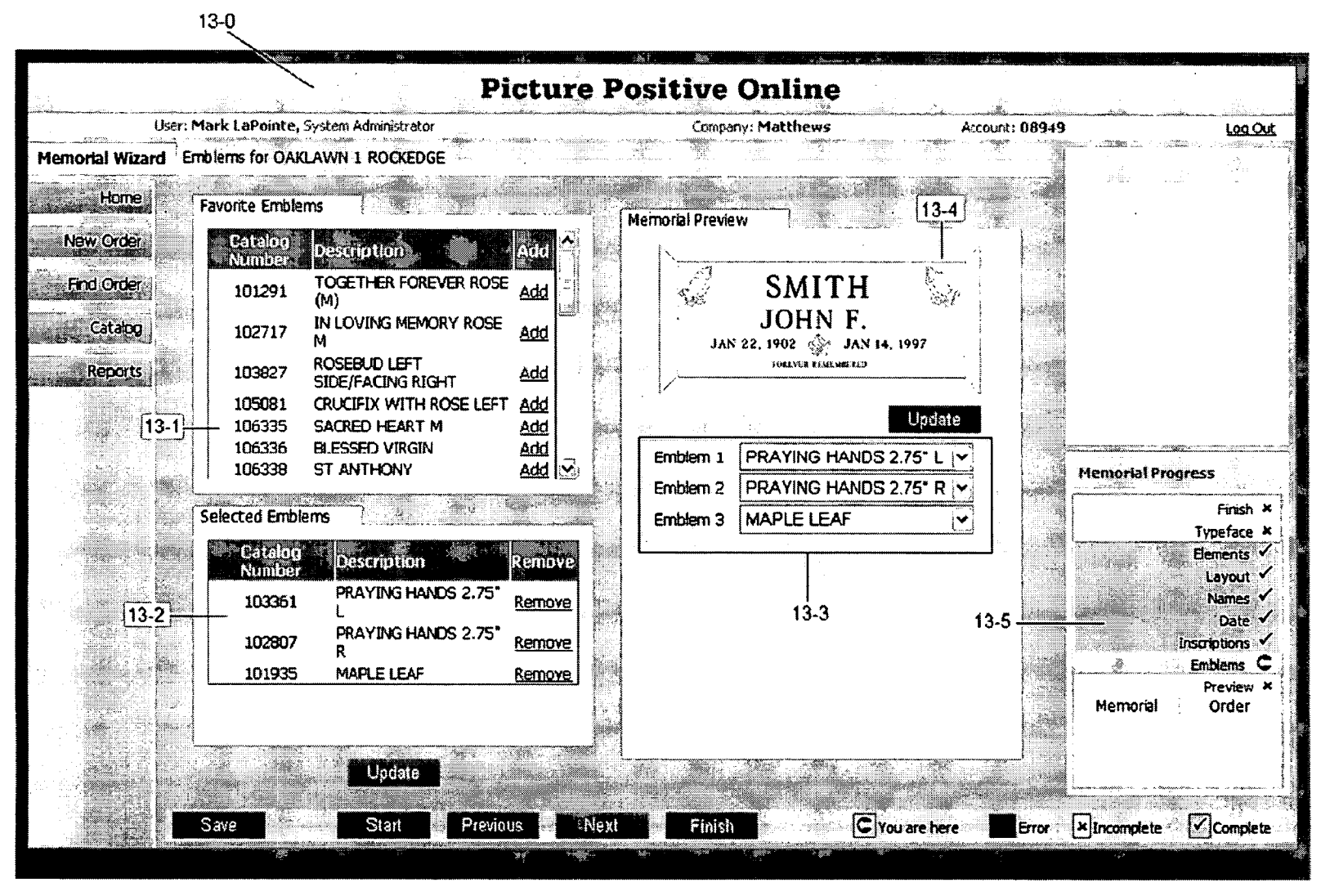

With reference to FIG. 13, a MDCS online emblem screen 13-0 is shown. MDCS online emblem screen 13-0 is for adding emblems to the memorial. MDCS online emblem screen 13-0 includes the favorite emblems 13-1, which can be configured to show the emblems in the pick list that are customized for the user's location. The user can make the emblem available for the memorial by clicking the add button. The selected emblem 13-2 shows the emblems that were selected for the memorial in the favorite emblems 13-1. A memorial preview 13-4 of MDCS online emblem screen 13-0 has select buttons 13-3 for selecting the location of each emblem. As shown in MDCS online emblem screen 13-0, emblem 1 has been selected to be on the left, emblem 2 has been selected to be on the right and maple leaf is selected in the middle, which can be shown in the updated memorial preview 13-4. The memorial progress meter 13-5 can be seen with the completed task and the current task showing emblems.

Figure 14:
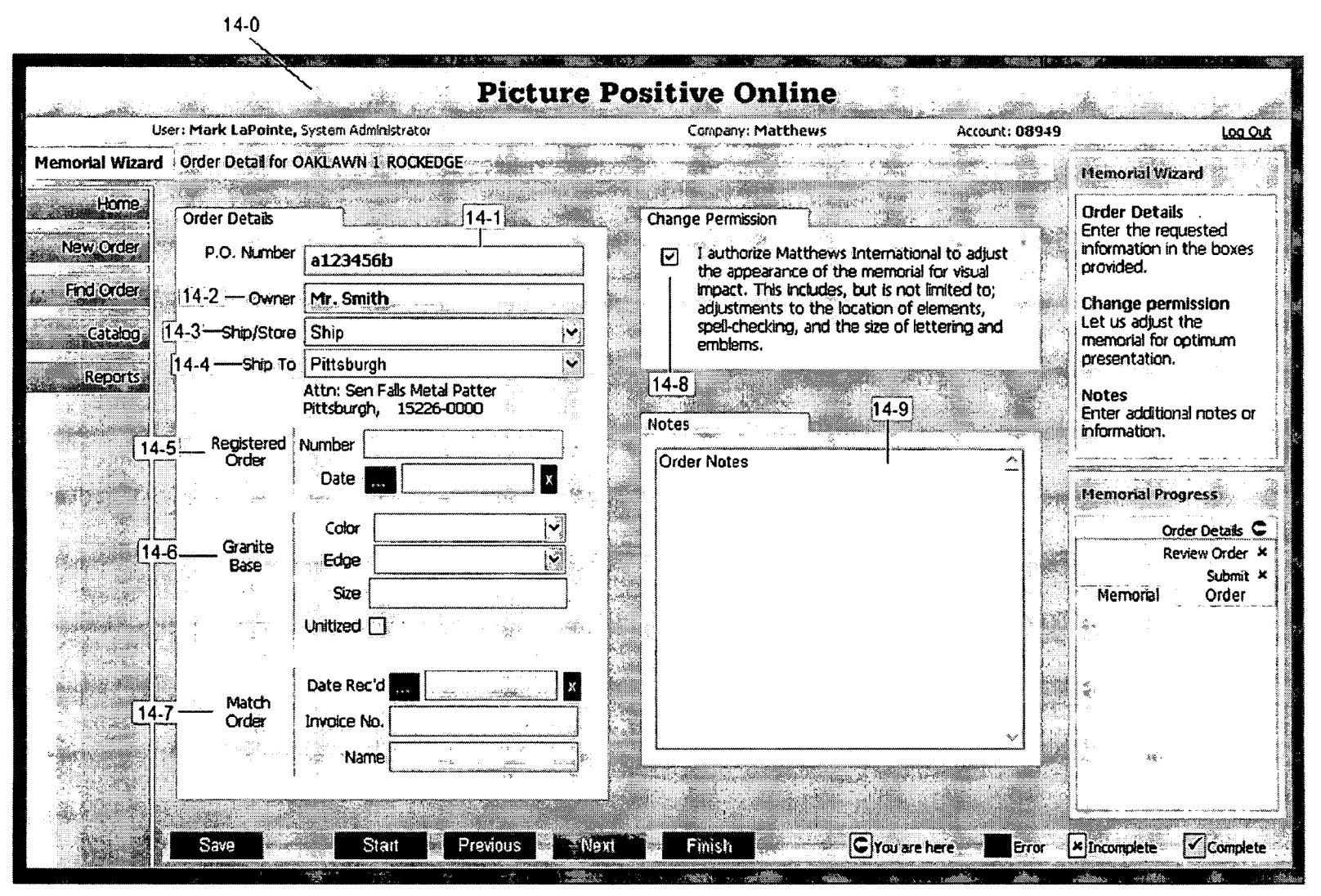

With reference to FIG. 14, MDCS online order detail screen 14-0 is shown. MDCS online order detail screen 14-0 is for entering administrative details to complete an order. MDCS online detail screen 14-0 includes fields for details such as purchase order number 14-1, owner 14-2, store 14-3 and ship to 14-4, as well as specifics including registered order 14-5, granite base 14-6 and match order 14-7. When a customer is entering a memorial preview and submitting it, change permission 14-8 allows the customer to authorize the user to adjust the appearance of the memorial for visual impact. This includes adjustments to the location of elements, spell checking and the size of text and emblems as needed. MDCS online detail screen 14-0 is representative to the memorial final product that can then be hand-crafted by technicians to make the memorial of better quality. Order notes can be entered into the notes 14-9. Any additional information pertaining to the order is entered into notes 14-9.

Figure 15:
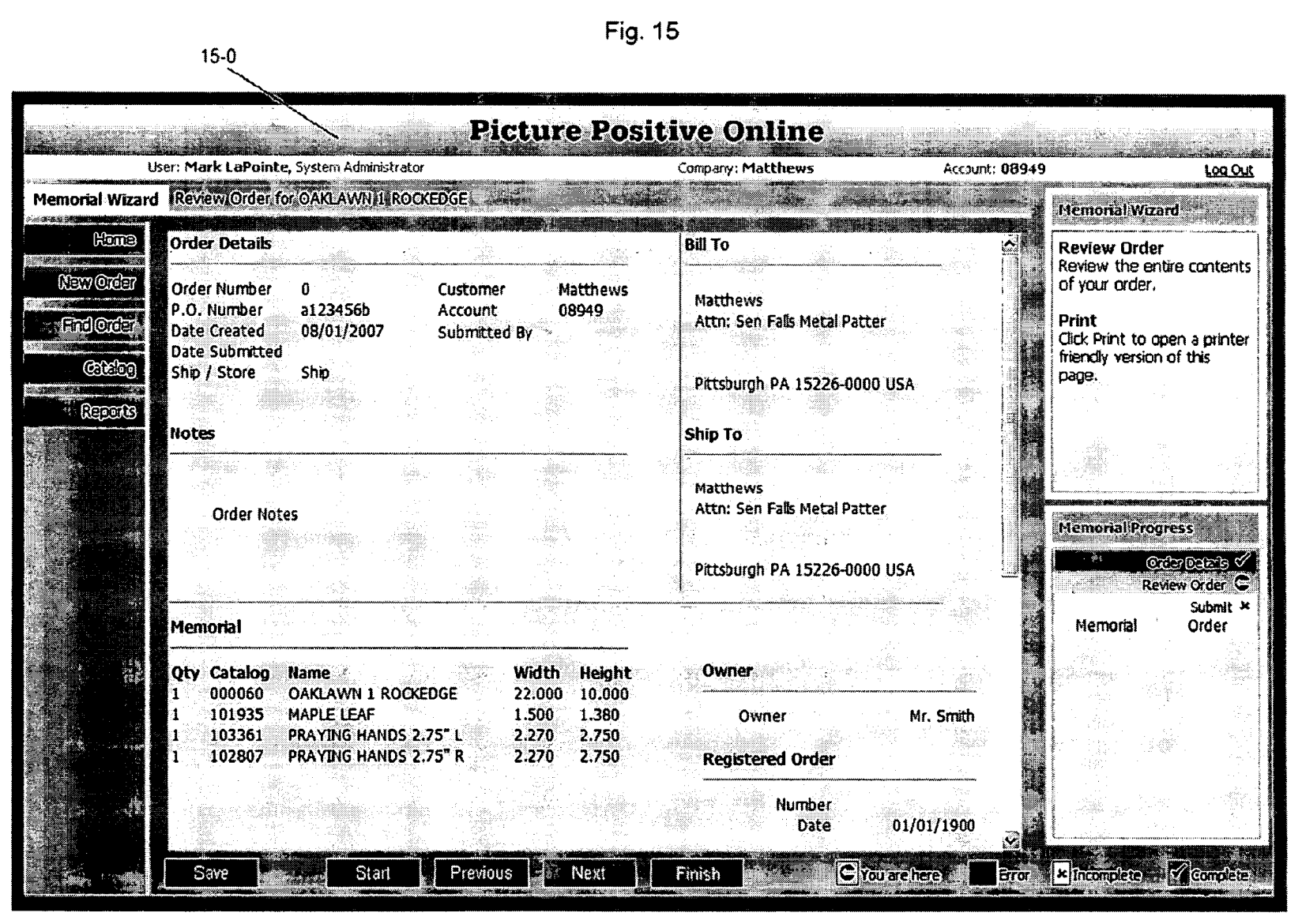

With reference to FIG. 15, a MDCS online order detail 15-0 is shown. MDCS online order details 15-0 is an informational screen which shows the status of the order information, the memorial information, the bill to and the ship to information.

Figure 16:
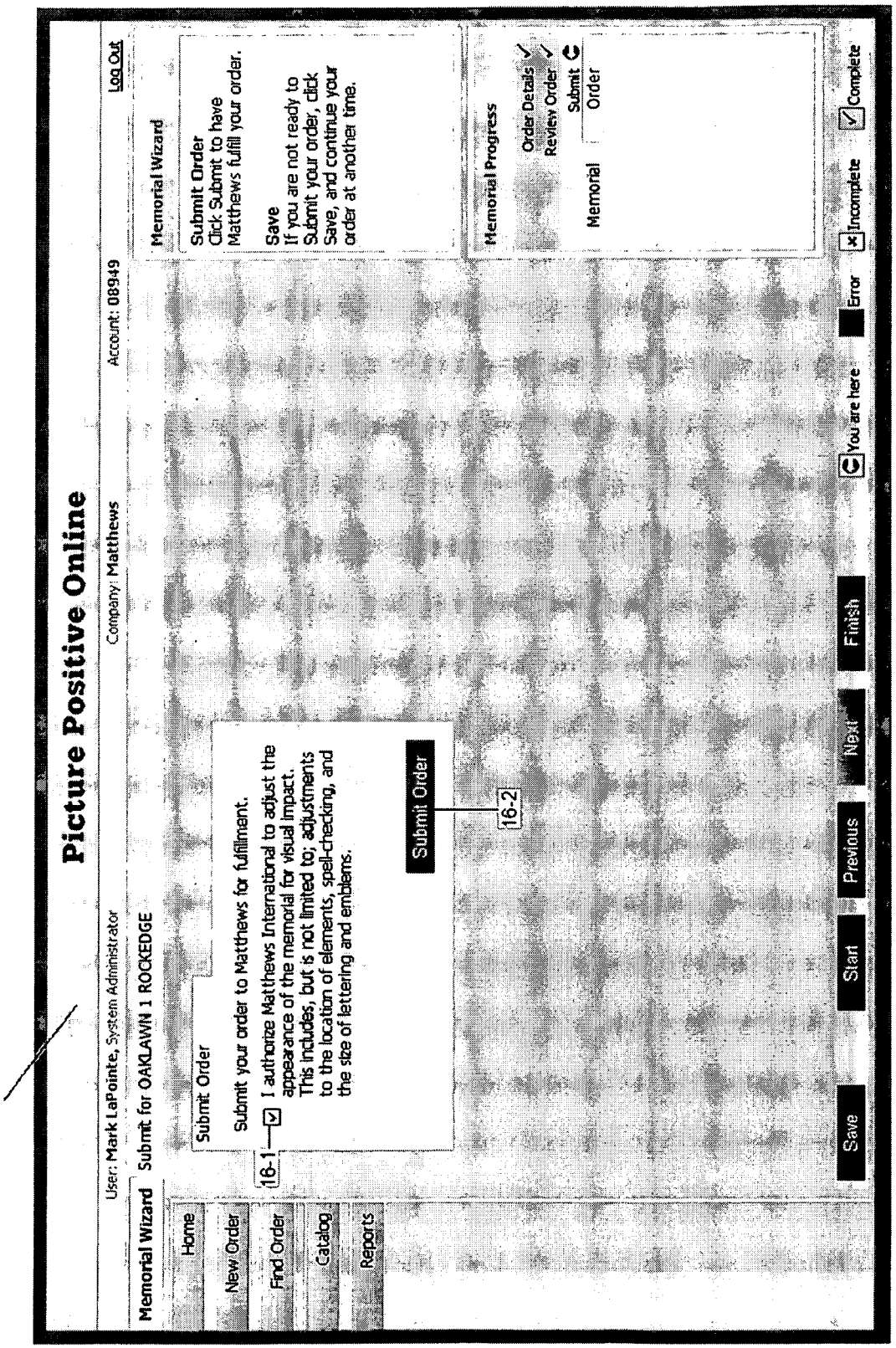
FIG. 16 illustrates a representative graphical user interface of a submission screen of an order detail of the present invention.

With reference to FIG. 16, a MDCS online submission screen 16-0 is for submitting an order when completed and sending the order to the manufacturer. MDCS online submission screen 16-0 includes a field for authorize changes 16-1. The authorize changes button 16-1 allows the user to authorize, again, the manufacturer to adjust the appearance if needed. Also included is the submit order 16-2 for submitting the order to the manufacturer processing system, at which time the order becomes a "live" order.

Figure 17:
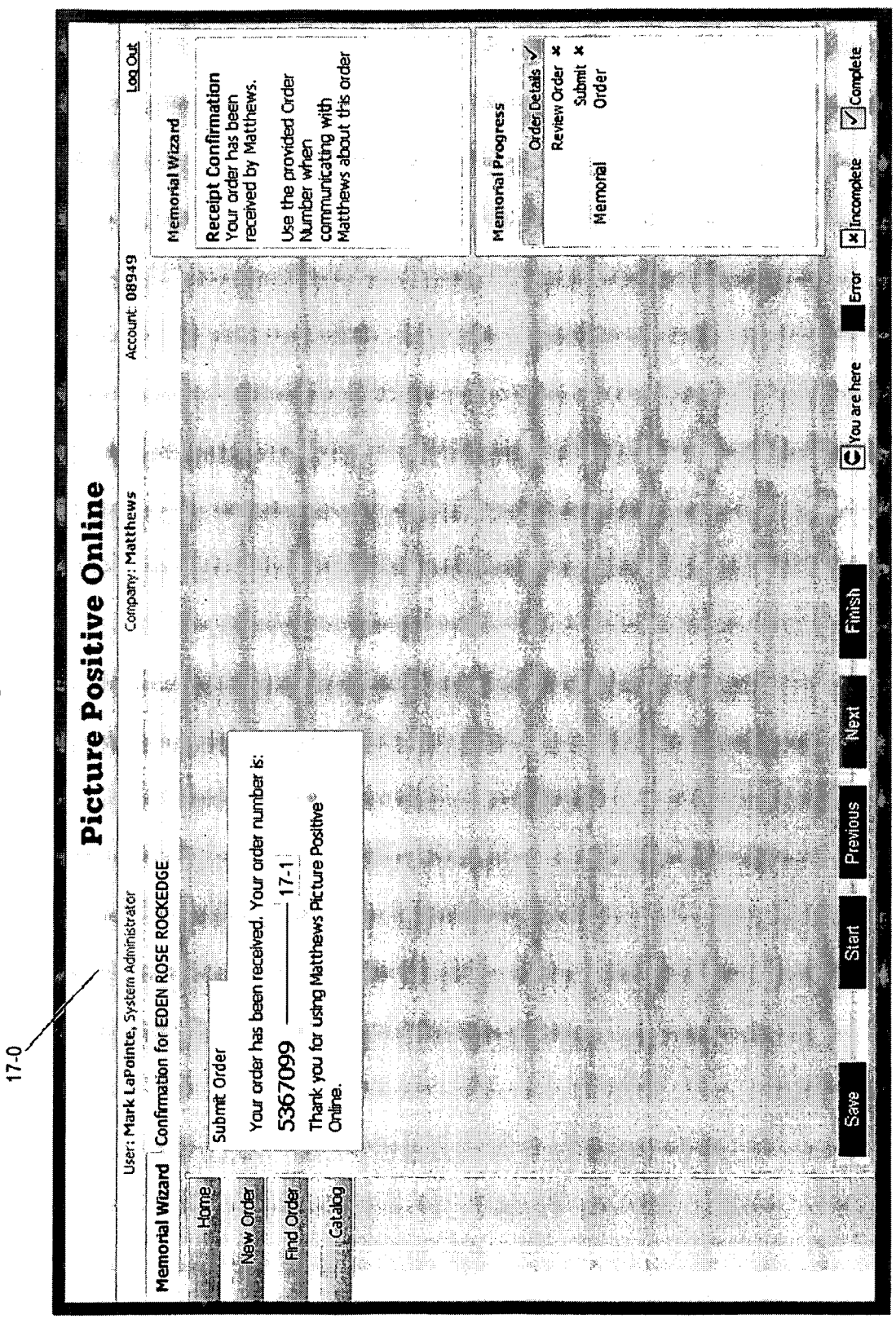
FIG. 17 illustrates a representative graphical user interface of a confirmation screen of an order detail of the present invention.

With reference to FIG. 17, MDCS online confirmation screen 17-0 is shown. MDCS online confirmation screen 17-0 allows a customer to confirm receipt of their order by the manufacturer. The MDCS online confirmation screen 17-0 includes a order number 17-1. Order number 17-1 allows for communication of the order between the manufacturer and the customer after the order has been submitted.

Figure 18:
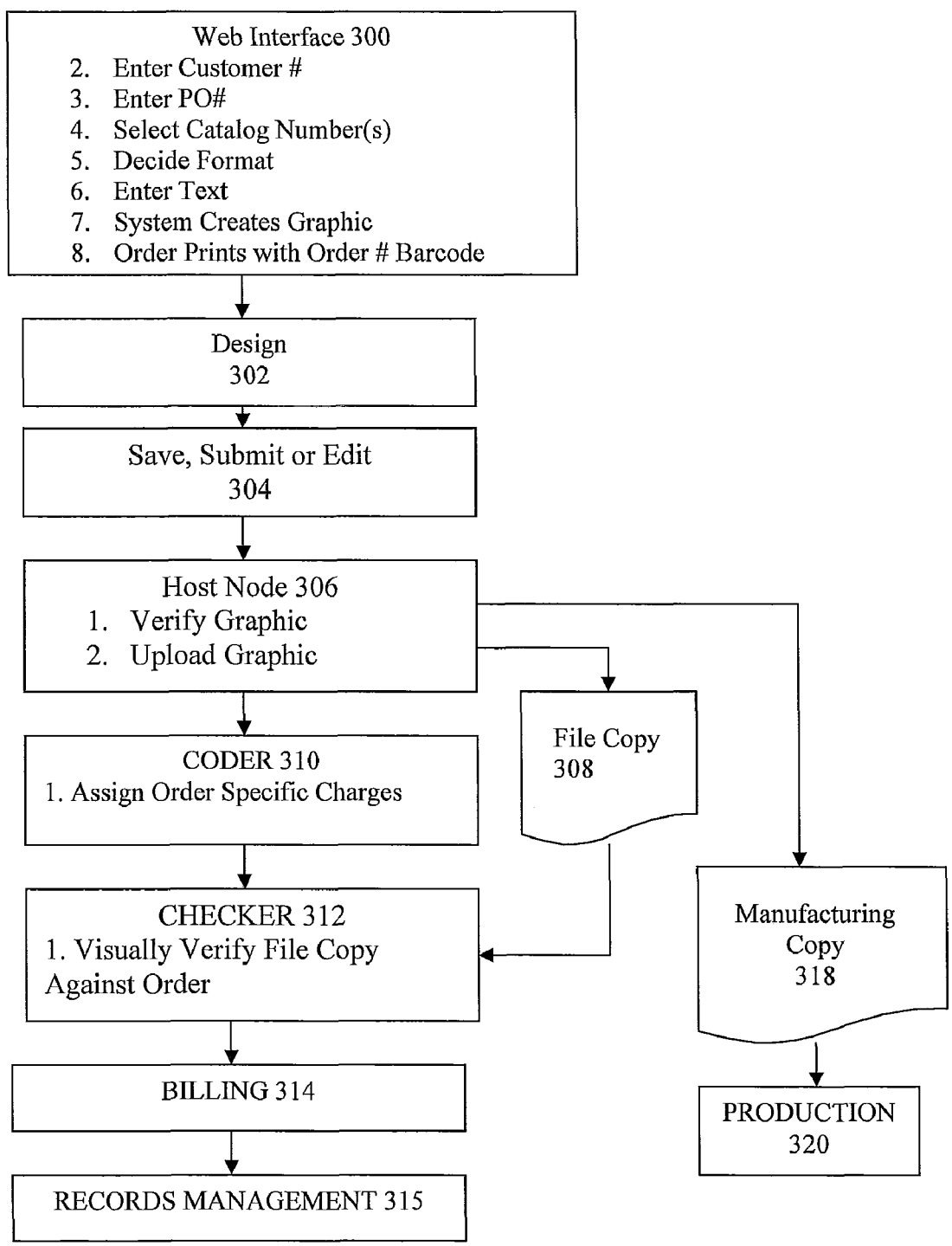
FIG. 18 is a step diagram of the ordering process of the present invention.

With reference to FIG. 18, a step diagram of the present invention is shown. In step 300, the system is accessed by a customer. The customer can register in the system and choose a user name and password to enter into the system, which will give the user access MDCS screens and catalog. A customer can enter a customer number and purchase order number.

At step 302, the user can begin design of a memorial by the selection using the MDCS screens. The user can begin either by entering a catalog number from the online catalog of memorial designs or browsing prior orders that were stored in the knowledge database and use these as a template to start from in the creation of a new memorial. A knowledge database can be any storage of prior transactions which is searchable for a specific customer.

With continuing reference to FIG. 18 and further reference to FIG. 5, in step 302, the MDCS online catalog screen 5-0 gives the customer a catalog from which to choose any available catalog item 5-4. The catalog items 5-4 can include any number of files that are called patterns and formats. The customer can choose a catalog number 5-5, for example "000060" with a description of "Oaklawn/Rockedge".

At step 304, the customer can submit the order. A customer, at step 304, has entered all data and has designed a memorial preview. The user is presented with a submit 46-2 button as shown in FIG. 16. The user can also save or edit the order at this step.

In step 306, after the seller/manufacturer receives the order from the customer, the seller verifies the graphical design and uploads the graphical image to the coder and to the manufacturer.

Figure 19:
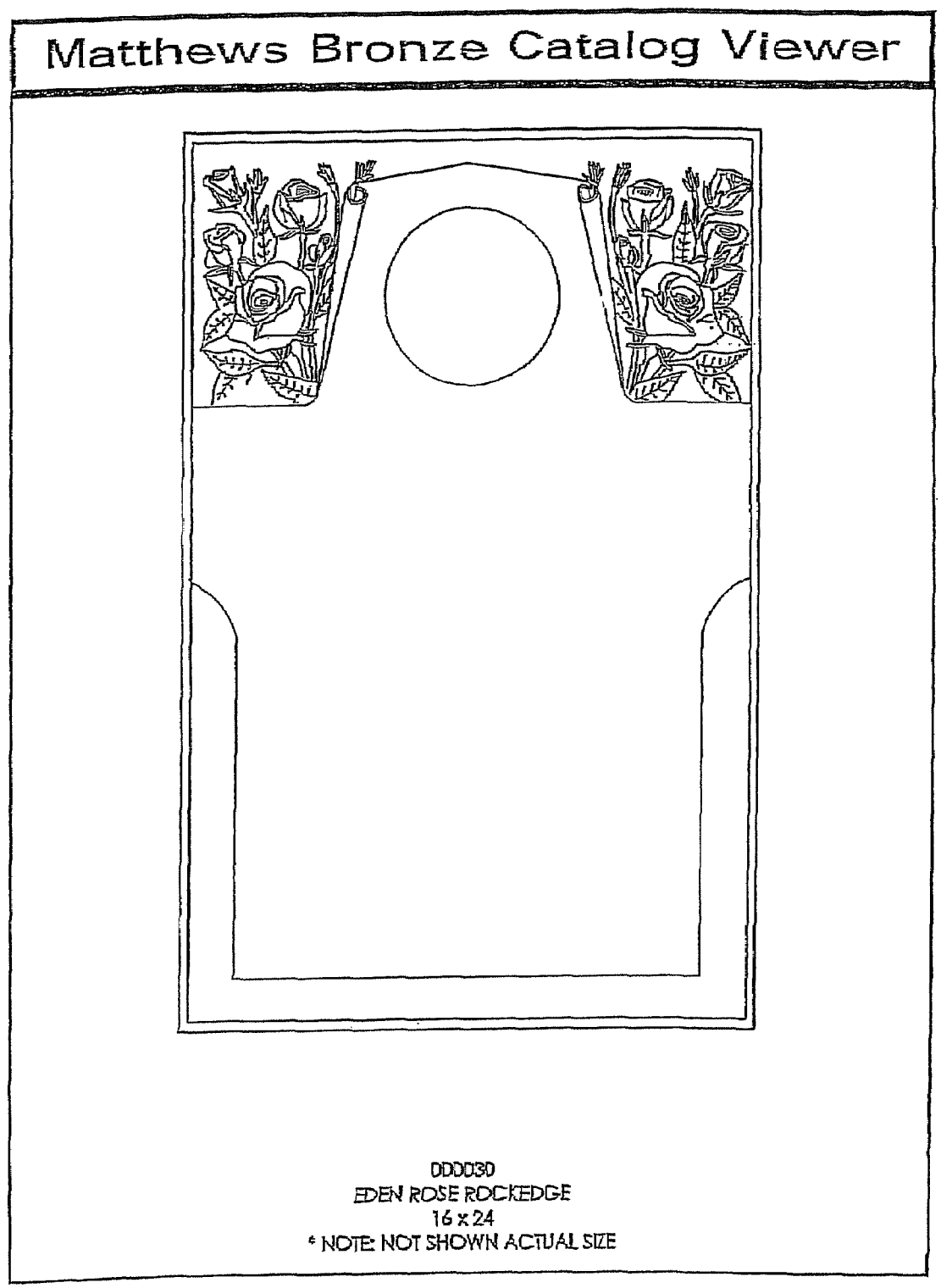
FIG. 19 illustrates a representative graphical design produced by the present invention.

In step 308, the graphical design is saved as a file copy. With reference to FIG. 19, a file copy is shown of a memorial with a headstone pattern of the EDEN ROSE ROCKEDGE catalog type. The file copy could also be bar coded for tracking purposes at this point. A file copy is used by the manufacturer if questions arise about an order.

In step 310, the coder assigns the order specific charges. In step 312, the order is visually verified against the file copy that was sent over originally, if it does not match, it must be formatted a second time until it matches the file copy. When it matches, the checker then sends the order to billing in step 314 where an invoice is created and sent to the customer and also maintained at step 316 in the records management system.

In step 318, the order is entered into a manufacturing software system after the graphic has been verified and uploaded at step 306. The order is bar-coded when it enters the production system. The bar-coding facilitates tracking of the design in production.

With continuing reference to FIG. 18, in step 320, the manufacturing software system uses the graphical design of the customer to create the physical memorial. In manufacturing, an initial blank pattern is used to start the process. The blank pattern is a three-dimensional solid and the size and shape the memorial is to be when finished. The blank pattern can have a border if the memorial is designed to have a border. Then, through the use of an overhead projector, the graphical design that the customer created and sent to the manufacturing system via the present invention is projected onto the blank three-dimensional solid. Letters and design objects are placed on the blank pattern to match the projected image. The letters and objects can be laid on the projector images. The letters or objects can be of some material such as zinc or lead and can be attached to the blank pattern after placement by some form of plastic or polyurethane coating that will hold the letters in place. The pattern can be used to create mold in a clamshell flask holding sand. The clamshell flask can hold material comprised of sand and various chemicals that strengthen the sand to hold the pattern. Any material known in the art will suffice. The mold can be filled with molten bronze and placed in the foundry to produce a completed memorial.

In step 320, the memorial is produced and sent to the customer or reseller where it is presented to the consumer for final review and retrieval.

Figure 20:
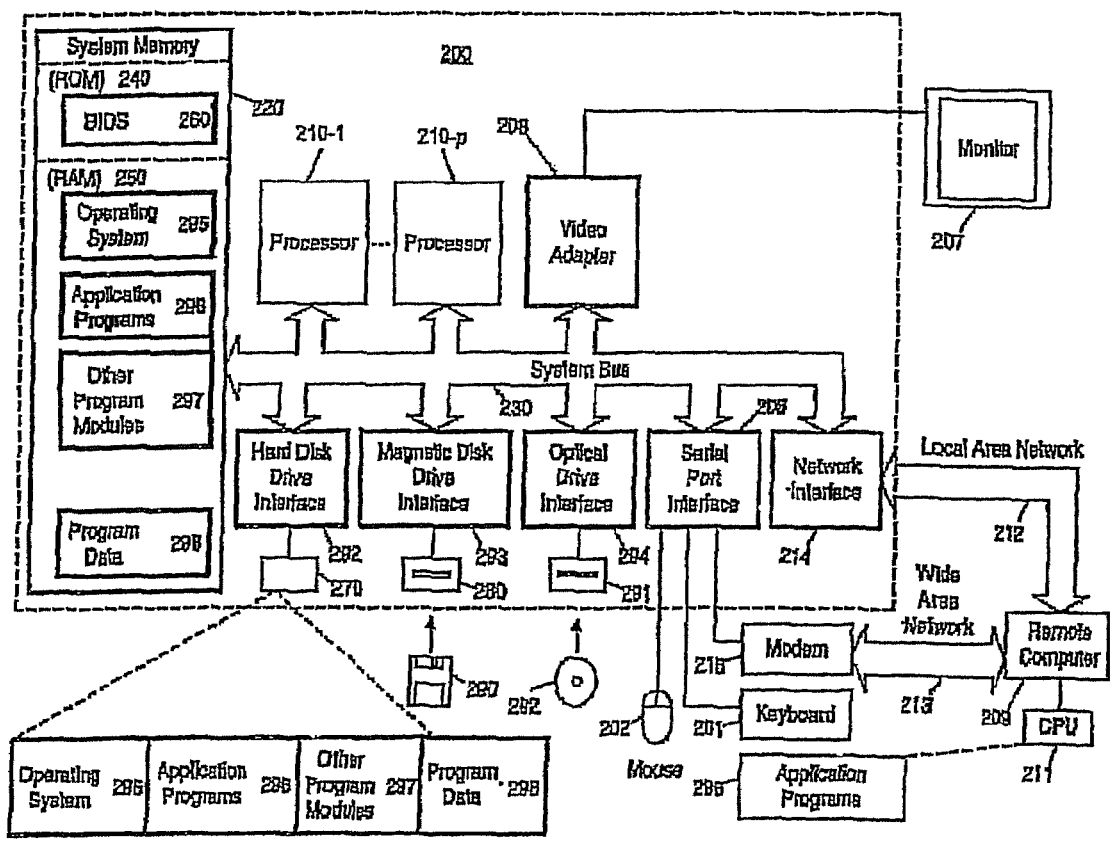
FIG. 20 is a schematic diagram of an exemplary system for practicing the present invention.
Figure 21:
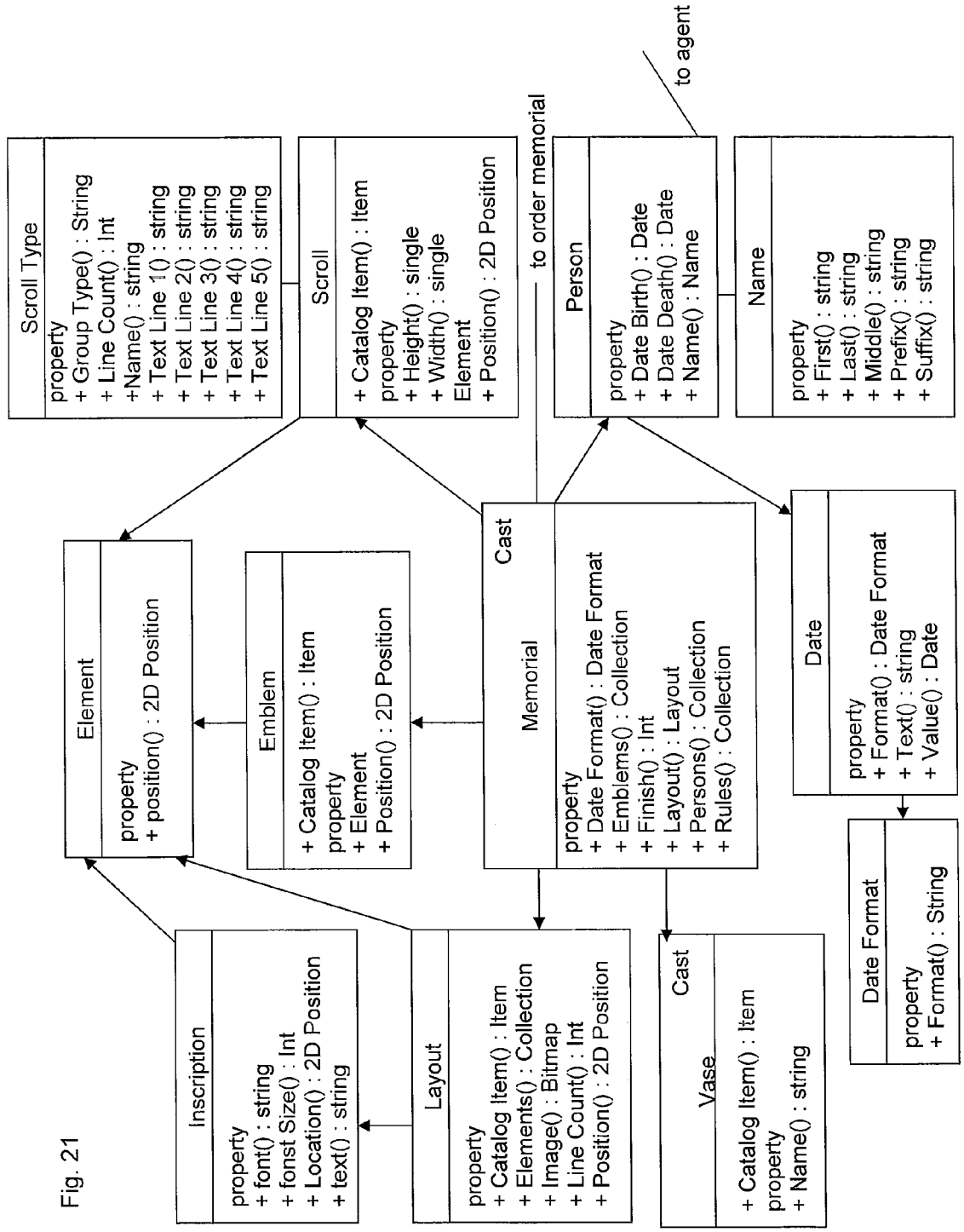
FIG. 21 is a diagram of a database for the present invention.

Those skilled in the art will appreciate that the computing environment may include all of the components shown in FIG. 20, a subset of these components or additional components as may be required by the specific implementation and the embodiments are not limited in this context. In various embodiments, a general purpose computing device 200 may be in the form of a personal computer, a server, a router, a switch, a network PC, a peer device, or other common network nodes that includes one or more processing units 210, a system memory 220 and a system bus 230 that couples various system components including the system memory 220 to one or more processing units 210. The system bus 230 may be any of several types of bus structures including a memory bus or memory controller, a peripheral bus and a local bus using any of a variety of bus architectures. The system memory includes read-only memory (ROM) 240 and random access memory (RAM) 250. A basic input/output system 260 containing the basic routines that help to transfer information between elements within the general purpose computing device 200, such as during startup, is stored in the ROM 240. The general purpose computing device 200 further includes a hard disk drive 270, a removable magnetic disk 290, an optical disk drive 291, an optical disk drive interface 294 and a magnetic disk drive interface 293. The drives and their associated computer readable media provide non-volatile storage of computer readable instructions. Although the exemplary environment described herein utilizes a hard disk, it should be appreciated by those skilled in the art that other types of computer readable media, which can store data that is accessible by a computer, such as magnetic sets, flash memory cards and digital video disks, may also be used in the exemplary operating environment.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

The invention claimed is:

1. A method for creating a memorial, comprising the steps of:
   providing a blank pattern having a specified shape and size and building a memorial preview thereon in a memorial design and collaboration system;
   projecting, onto a three-dimensional solid in the shape of said blank pattern, an image of said memorial preview;
   creating a pattern by placing objects on the three-dimensional solid in connection with the projection;
   creating a mold in connection with the pattern; and
   providing an entry options screen for adding a date for said memorial preview, wherein said entry options screen further includes format options and line number options.

2. The method as described in claim 1, further comprising the steps of filling said mold and baking the filled mold.

3. The method as described in claim 1, further comprising the step of including a pattern on said three-dimensional solid prior to projecting said memorial preview.

4. The method as described in claim 3, further comprising the step of forming a border on said solid.

5. The method as described in claim 1, further comprising the step of providing a layout view of said memorial preview.

6. The method as described in claim 5, wherein at least one item is displayed on said memorial preview.

7. The method as described in claim 1, further comprising the step of selecting an item for said memorial preview.

8. The method as described in claim 7, wherein said item comprises: a finish, people name, family name or a date.

9. The method as described in claim 7, wherein said item is stored in a catalog in a database.

10. The method as described in claim 9, wherein said catalog is searchable based on text, security permissions or catalog identification numbers.

11. The method as described in claim 1, further comprising the step of adding an emblem for said memorial preview.

12. The method as described in claim 11, further comprising the step of providing a personal emblem list for selecting said emblem for said memorial preview.

13. The method as described in claim 12, further comprising the step of entry of position information for positioning said emblems on said memorial preview.

14. The method as described in claim 1, further comprising the step of adding a vase for said memorial preview.

15. The method as described in claim 1, further comprising the step of adding an inscription for said memorial preview.

16. The method as described in claim 1, further providing an order entry in said memorial design and collaboration system for said memorial preview, comprising the steps of:
   logging onto the system;
   storing data comprising:
   customer information;
   order number associated therewith;

a purchase order number;
shipping information;
order notes; and
validating inventory.

17. The method as described in claim 16, further comprising the step of saving said memorial preview into a memorial preview file in memory.

18. The method as described in claim 17, further comprising the steps of:
providing a button;
transmitting on actuation of said button, said memorial preview file and said data file stored in memory to a host;
checking said data; and
verifying said memorial preview file.

19. A method for creating a memorial, comprising the steps of:
providing a blank pattern having a specified shape and size and building a memorial preview thereon in a memorial design and collaboration system;
projecting, onto a three-dimensional solid in the shape of said blank pattern, an image of said memorial preview;
creating a pattern by placing objects on the three-dimensional solid in connection with the projection;
creating a mold in connection with the pattern;
providing an order entry in said memorial design and collaboration system for said memorial preview, comprising the steps of:
logging onto the system, storing data comprising customer information, associating an order number, associating a purchase order number, associating shipping information, inputting order notes, and validating inventory, storing a data field in said memorial design application software having an on and off state for determining permission for changing the memorial preview.

\* \* \* \* \*

UNITED STATES PATENT AND TRADEMARK OFFICE
CERTIFICATE OF CORRECTION

| | | |
|---|---|---|
| PATENT NO. | : 7,894,924 B2 | |
| APPLICATION NO. | : 11/937767 | |
| DATED | : February 22, 2011 | |
| INVENTOR(S) | : Proudfoot | |

It is certified that error appears in the above-identified patent and that said Letters Patent is hereby corrected as shown below:

In the drawing sheets, consisting of Figs. 3-17, should be deleted to be replaced with the drawing sheets, consisting of Figs. 3-17, as shown on the attached pages.

Signed and Sealed this
Fourteenth Day of June, 2011

David J. Kappos
*Director of the United States Patent and Trademark Office*

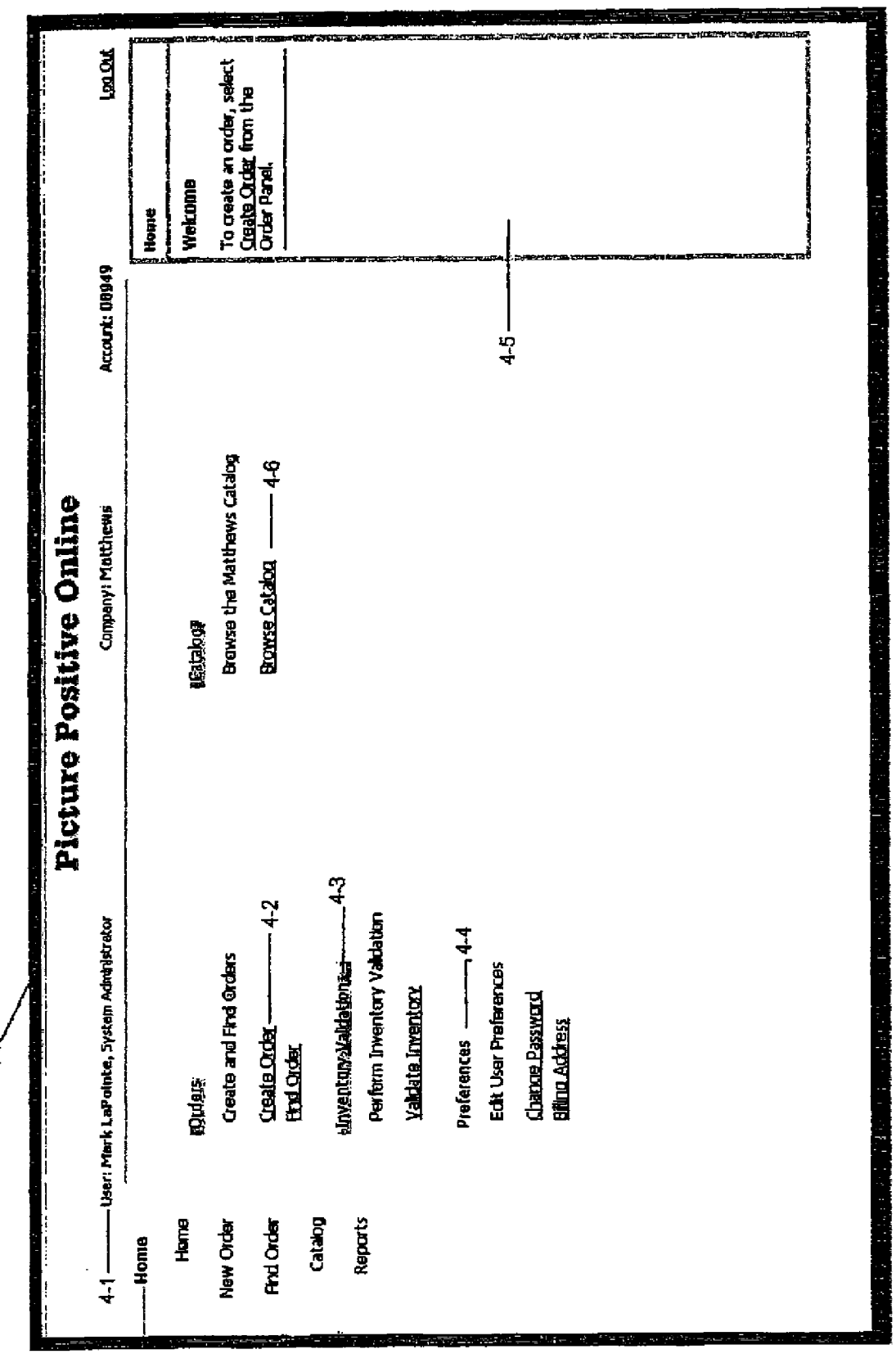

Fig. 5

Picture Positive Online

User: Mark LaPointe, System Administrator   Company: Matthews   Account: 000949   Log Out Browse Catalog Home
New Order
5-1 — Catalog No. [          ]
Find Order
5-2 — Description [ rock ]
Catalog 5-3 — Group [ Memorial ]
Reports

[ Search ]

5-8
—
Size

○ Select Size    ● Popular
                 ○ All

○ Specify Size  [   ] x [   ] Inches 5-4 — Catalog Items 5-5
| CATALOG NUMBER | DESCRIPTION | WIDTH | HEIGHT | VASE | ORDER |
|---|---|---|---|---|---|
| 000030 | EDEN ROSE ROCKEDGE | 16.000 | 24.000 | | Order |
| 000018 | EDEN OAKLAWN 1 ROCKEDGE | 16.000 | 24.000 | | Order |
| 000060 | OAKLAWN 1 ROCKEDGE | 22.000 | 24.000 | | Order |
| 000136 | DOGWOOD 2 ROCKEDGE | 24.000 | 12.000 | | Order |
| 000275 | GARDEN ROSE ROCKEDGE | 24.000 | 14.000 | | Order |
| 004687 | PINEBOUGH ROCKEDGE | 44.000 | 14.000 | | Order |

5-6        5-7

Catalog
This is the Matthews Catalog of products. The items presented have been customized for your business.

Product Type
Search the Catalog by entering a partial or complete Catalog Number, partial or complete Description, and select the type of product for which to search.

Size
Select a defined size for which to search, or enter a custom size.

Catalog Items
The results of your search appear here. Click the Catalog Number to see details about the item, and an image, if one is available. To begin a new order with the catalog item, Click Order.

5-0

Fig. 8

*Picture Positive Online*

User: Mark LaPointe, System Administrator  Company: Matthews  Account: 000149  Log Out Elements for OAKLAWN 1 ROCKEDGE Home
New Order
Find Order
Catalog
Reports

8-1 People [1 ▼] — Select the number of people represented by the memorial. You will enter their names later. If no names are to appear on the memorial, leave this value set to zero.

8-2 Family Name [☑] — Check this box if the family name appears by itself on the memorial.

8-3 Dates [☑] — Check this box if dates appear on the memorial.

8-4 Scrolls [☐] — Check this box if the dates are placed on scrolls. Scrolls are additional pieces attached to the memorial.

Select Elements
Select the elements of the memorial. Elements include names, scrolls, emblems, and cemetery information.
You will choose a layout based on your selections.

8-5 Emblems [3 ▼] — Select the number of emblems to appear on the memorial. Emblems are non-text elements that appear on the memorial, such as crosses.

8-6 Vases [0 ▼] — Select the number of vases to accompany the memorial.

8-7 Additional Inscriptions [1 ▼] — Select the number of additional inscriptions. These are titles, cemetery information, and other distinct text elements.

8-8 Cemetery Information [☑] — Check this box if cemetery information such as lot, unit, or section is to appear on the memorial.

Memorial Progress

Finish ✓
Typeface ✓
Elements ⊙
Layout ✗
Preview ✗
Order ✗

Memorial

Fig. 11

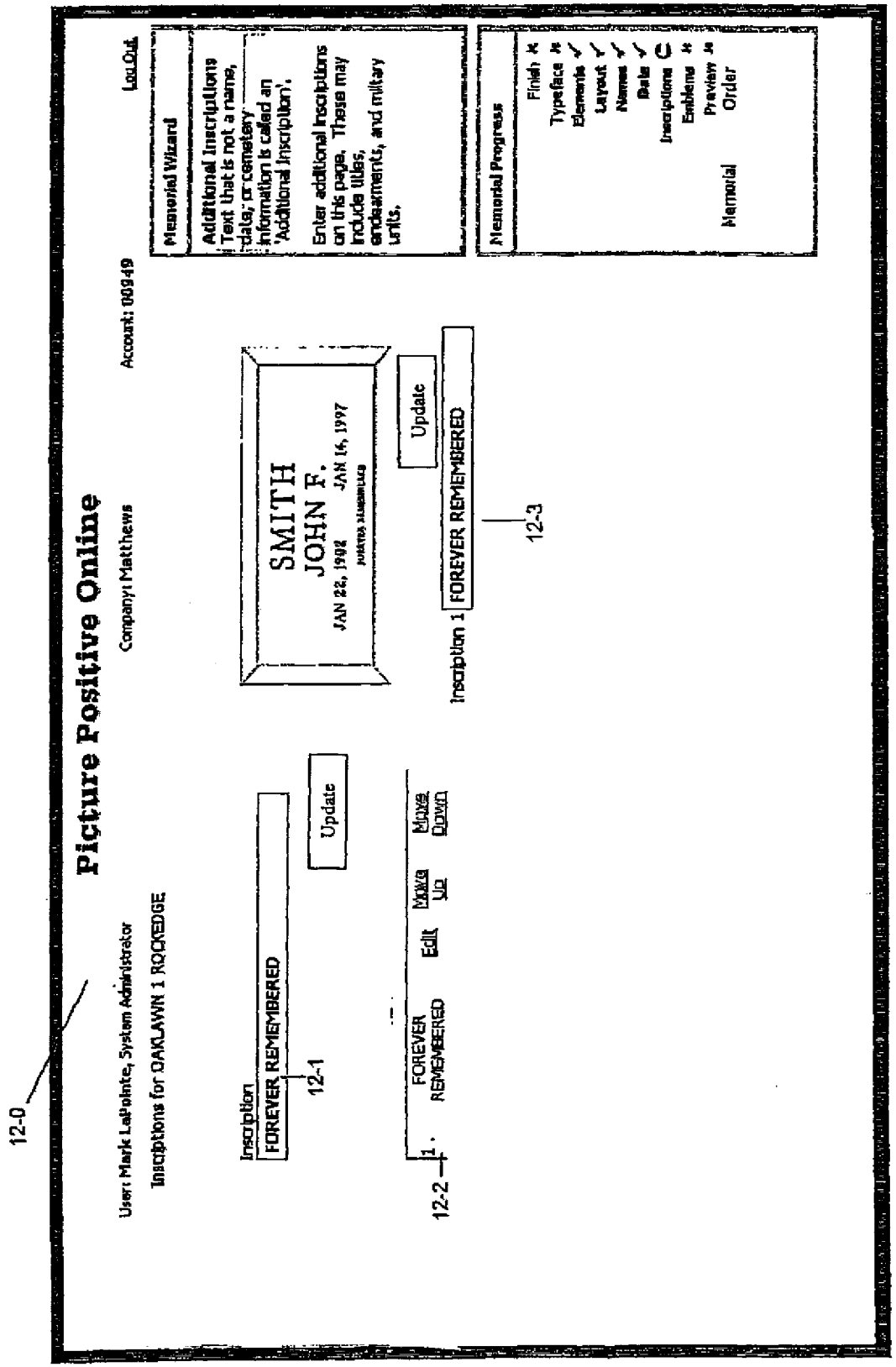

Picture Positive Online

User: Mark LaPointe, System Administrator   Company: Matthews   Account: 08949   Log Out Memorial Wizard — Review Order for OAKLAWN 1 ROCKEDGE

| | |
|---|---|
| Home | Order Details |
| New Order | Order Number: 0 |
| Find Order | P.O. Number: a123456b |
| | Date Created: 08/01/2007 |
| Catalog | Date Submitted: |
| Reports | Ship / Store: Ship |

Customer: Matthews
Customer Account: 08949
Submitted By:

Memorial Wizard
Review Order
Review the entire contents of your order.

Print
Click Print to open a printer friendly version of this page.

Memorial Progress:
Order Details ✓
Review Order ●
Memorial    Submit Order

Notes

Order Notes

Bill To
Matthews
Attn: San Falls Metal Patter

Pittsburgh PA 15226-0000 USA

Ship To
Matthews
Attn: San Falls Metal Patter

Pittsburgh PA 15226-0000 USA

Owner

Owner: Mr. Smith

Registered Order
Number
Date: 01/01/1900

Memorial

| Qty | Catalog | Name | Width | Height |
|---|---|---|---|---|
| 1 | 000060 | OAKLAWN 1 ROCKEDGE | 22.000 | 10.000 |
| 1 | 101935 | MAPLE LEAF | 1.500 | 1.380 |
| 1 | 103361 | PRAYING HANDS 2.75" L | 2.270 | 2.750 |
| 1 | 102807 | PRAYING HANDS 2.75" R | 2.270 | 2.750 |

15-0

Fig. 16

Picture Positive Online

User: Mark LaPointe, System Administrator    Company: Matthews    Account: 00949    Log Out Memorial Wizard: Submit for OAKLAWN 1 ROCKLEDGE

- Home
- New Order
- Find Order
- Catalog
- Reports

Submit Order

Submit your order to Matthews for fulfillment.

16-1 — ☑ I authorize Matthews International to adjust the appearance of the memorial for visual impact. This includes, but is not limited to; adjustments to the location of elements, spell-checking, and the size of lettering and emblems.

[ Submit Order ]  16-2

Memorial Wizard

Submit Order
Click Submit to have Matthews fulfill your order.

Save
If you are not ready to Submit your order, click Save, and continue your order at another time.

Memorial Progress

Memorial
- Order Details ✓
- Review Order ✓
- Submit Order ○

16-0

Fig. 17

Picture Positive Online

User: Mark LaPointe, System Administrator  Company: Matthews  Account: D0949  Log Out Confirmation for EDEN ROSE ROCKEDGE

SubmitaOrder#

Your order has been received. Your order number is:

53367099 —— 17-1

Thank you for using Matthews Picture Positive® Online.

New Order
Find Order
Catalog

Memorial Wizard

Receipt Confirmation
Your order has been received by Matthews.

Use the provided Order Number when communicating with Matthews about this order

Memorial Progress

Order Details ✓
Review Order ✗
Submit ✗
Order

Memorial 17-0